United States Patent
Gallupe et al.

(10) Patent No.: US 7,043,341 B2
(45) Date of Patent: May 9, 2006

(54) SWIMMING POOL AND SPA HEATER CONTROL SYSTEM AND METHOD

(75) Inventors: Gary W. Gallupe, Belleair, FL (US); Greg Ouzounian, Castro Valley, CA (US); Brian Langille, Clearwater, FL (US)

(73) Assignee: Measure, Monitor and Control, LLC, Belleair, FL (US)

( * ) Notice: Subject to any disclaimer, the term of this patent is extended or adjusted under 35 U.S.C. 154(b) by 259 days.

(21) Appl. No.: 10/748,841

(22) Filed: Dec. 31, 2003

(65) Prior Publication Data

US 2004/0230344 A1 Nov. 18, 2004

Related U.S. Application Data

(60) Provisional application No. 60/436,972, filed on Dec. 31, 2002.

(51) Int. Cl.
*G05D 23/00* (2006.01)

(52) U.S. Cl. ............ 700/300; 700/282; 4/493

(58) Field of Classification Search ........ 700/275–278, 700/281, 282, 299, 300; 236/12.1, 20 R–21 B, 236/91 R, 91 C–91 F; 4/488, 492, 493
See application file for complete search history.

(56) References Cited

U.S. PATENT DOCUMENTS

| 4,217,646 A | 8/1980 | Caltagirone et al. ........ 700/296 |
| 4,775,944 A | 10/1988 | Nakamura ................ 700/277 |
| 5,479,358 A | 12/1995 | Shimoda et al. ............ 700/291 |
| 5,684,710 A * | 11/1997 | Ehlers et al. ............... 700/293 |
| 5,696,695 A * | 12/1997 | Ehlers et al. ............... 700/286 |
| 5,700,993 A | 12/1997 | Counsell et al. ............ 219/483 |
| 5,809,942 A * | 9/1998 | Kralovec et al. ...... 122/235.14 |
| 5,924,486 A | 7/1999 | Ehlers et al. ............... 165/238 |
| 6,098,893 A | 8/2000 | Berglund et al. ............. 236/51 |
| 6,145,139 A * | 11/2000 | Bonn ............................. 4/493 |
| 6,430,953 B1 | 8/2002 | Roh ............................. 62/231 |
| 6,439,469 B1 | 8/2002 | Gruber et al. ............. 237/8 R |
| 6,454,177 B1 | 9/2002 | Sasao et al. .............. 236/46 R |
| 6,676,831 B1 * | 1/2004 | Wolfe ........................ 210/85 |
| 2002/0108913 A1 * | 8/2002 | Collins ..................... 210/764 |
| 2003/0034284 A1 * | 2/2003 | Wolfe ......................... 210/85 |
| 2003/0168516 A1 * | 9/2003 | Cline ....................... 237/2 A |

FOREIGN PATENT DOCUMENTS

| GB | 2 212 949 | 2/1989 |
| JP | 407043001 A | 2/1995 |
| JP | 408035706 A | 2/1996 |
| WO | WO 94/27202 | 11/1994 |

* cited by examiner

*Primary Examiner*—Maria N. Von Buhr
(74) *Attorney, Agent, or Firm*—Berenato, White & Stavish

(57) ABSTRACT

A system and method for controlling swimming pool or spa heaters is provided in the present invention. The system and method control the temperature of the pool or spa water and saves energy by heating the water therein only when future weather conditions indicate that it will be feasible and cost effective to do so in an automated process that depends upon forecast and actual weather and measured data at the pool. The system and method also utilize prior actual experience in heating the pool or spa to subsequently improve energy savings over time.

12 Claims, 14 Drawing Sheets

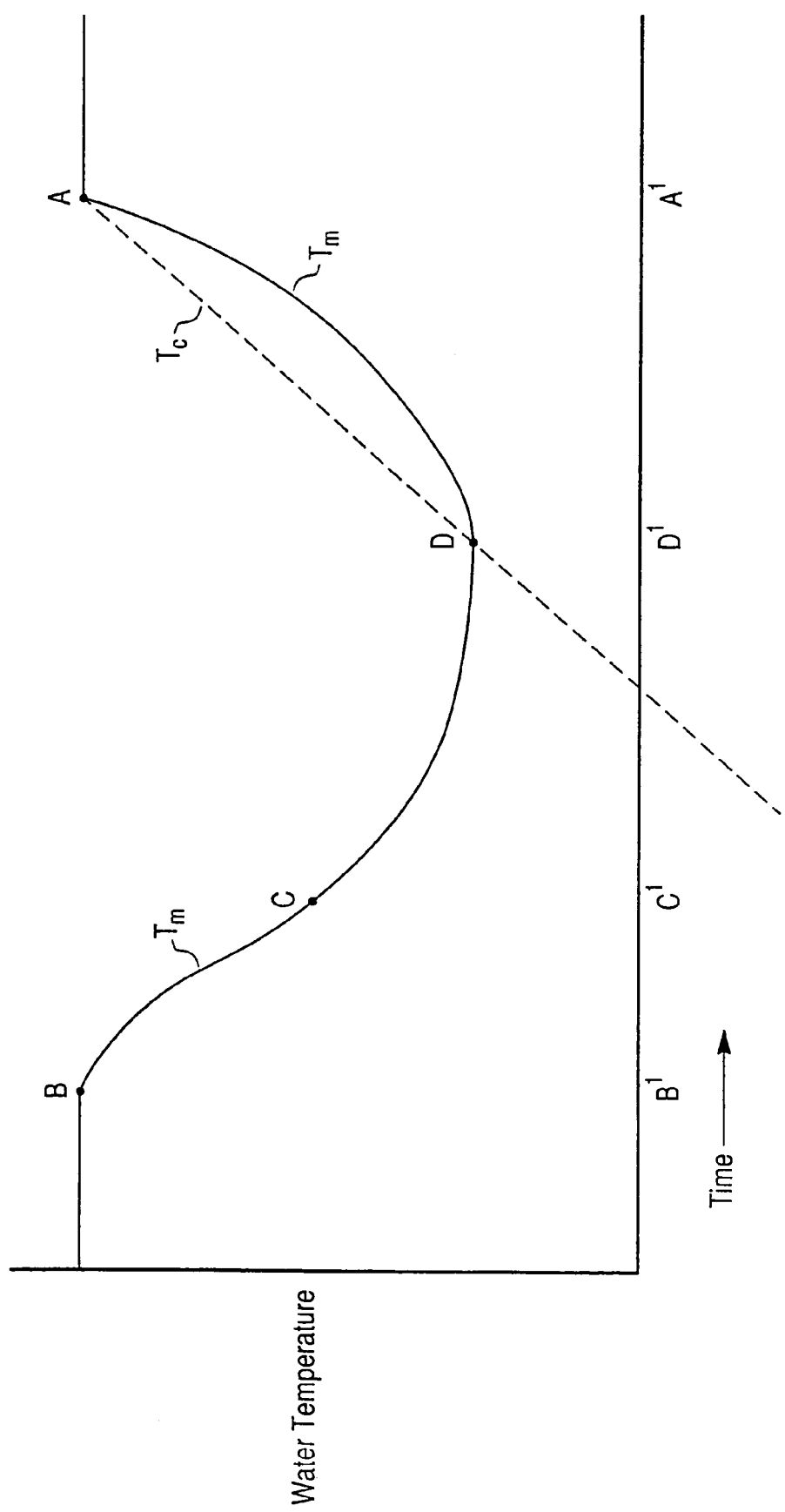

Fig. 7A

| | A | B | C | D | E | F | G | H | I | J | K | L | M | N | O | P | Q | R | S | T | U | V |
|---|---|---|---|---|---|---|---|---|---|---|---|---|---|---|---|---|---|---|---|---|---|---|
| 1 | | 1/15/10 | 10:01 AM | | | | | | | | | | | | | | | | | | | |
| 2 | | Area F | 2,400 | | | | | | | | | | | | | | | | | | | |
| 3 | | | | | | | | | | | | | | | | | | | | | | |
| 4 | | lbs of water | 823,455 | | | | | | | | | | | | | | | | | | | |
| 5 | | Qh Btu's/hr | 2,460,000 | | | | | | | | | | | | | | | | | | | |
| 6 | | | | | | | | | | | | | | | | | | | | | | |
| 7 | | ΔTh | 2.99 | | | | | | | | | | | | | | | | | | | |
| 8 | | Altitude feet | 2300 | | | | | | | | | | | | | | | | | | | |
| 9 | | | | | | | | | | | | | | | | | | | | | | |
| 10 | | | Finalnov 19 | | | | | | | | | | | | | | | | | | | |
| 11 | | | | | | | | | Gr | | | | | Pw- | | | | | | | | |
| 12 | | | | Vwf | Wmf | Ta | Rha | Note | Tdp | Pdp | Tm | Tc | Pw | Pdp | Tsky | Note | Note | ΔTe | ΔTc | ΔTr | ΔTs | Vwc |
| 13 | | | | [MPH] | [DEG] | [°F] | [%] | 3 | [°F] | [PSI] | [°F] | [°F] | [PSI] | [PSI] | [°F] | 1 | 2 | [°F] | [°F] | [°F] | [°F] | [MPH] |
| 14 | 1 | 1/15/10 | 10:00 AM | 0.0 | 90.0 | 55.0 | 45.0 | 31.4 | 34.1 | 0.10 | 70.0 | 22.0 | 0.07 | -0.02 | 15.0 | 555 | 509 | -0.01 | -0.22 | 0.00 | 0.20 | 5.00 |
| 15 | 1 | 1/15/10 | 11:00 AM | 1.0 | 90.0 | 55.0 | 45.0 | 31.4 | 34.1 | 0.10 | | 25.4 | 0.08 | -0.01 | 15.0 | 571 | 509 | 0.01 | -0.20 | 0.00 | 0.20 | 5.15 |
| 16 | 1 | 1/15/10 | 12:00 PM | 2.0 | 90.0 | 55.0 | 45.0 | 31.4 | 34.1 | 0.10 | | 28.7 | 0.09 | 0.01 | 15.0 | 586 | 509 | 0.03 | -0.18 | 0.00 | 0.20 | 5.30 |
| 17 | 1 | 1/15/10 | 1:00 PM | 3.0 | 90.0 | 55.0 | 45.0 | 31.4 | 34.1 | 0.10 | | 32.1 | 0.10 | 0.02 | 15.0 | 602 | 509 | 0.05 | -0.15 | 0.00 | 0.20 | 5.45 |
| 18 | 1 | 1/15/10 | 2:00 PM | 4.0 | 90.0 | 55.0 | 45.0 | 31.4 | 34.1 | 0.10 | | 35.4 | 0.12 | 0.03 | 15.0 | 618 | 509 | 0.07 | -0.13 | 0.00 | 0.20 | 5.60 |
| 19 | 1 | 1/15/10 | 3:00 PM | 5.0 | 90.0 | 55.0 | 45.0 | 31.4 | 34.1 | 0.10 | | 38.6 | 0.13 | 0.05 | 15.0 | 634 | 509 | 0.10 | -0.11 | 0.00 | 0.20 | 5.75 |
| 20 | 1 | 1/15/10 | 4:00 PM | 6.0 | 90.0 | 55.0 | 45.0 | 31.4 | 34.1 | 0.10 | | 41.8 | 0.15 | 0.07 | 15.0 | 650 | 509 | 0.13 | -0.08 | 0.00 | 0.20 | 5.90 |
| 21 | 1 | 1/15/10 | 5:00 PM | 7.0 | 90.0 | 55.0 | 45.0 | 31.4 | 34.1 | 0.10 | | 44.9 | 0.17 | 0.09 | 15.0 | 666 | 509 | 0.17 | -0.06 | 0.00 | 0.20 | 6.05 |
| 22 | 1 | 1/15/10 | 6:00 PM | 8.0 | 90.0 | 55.0 | 45.0 | 31.4 | 34.1 | 0.10 | | 48.0 | 0.18 | 0.11 | 15.0 | 682 | 509 | 0.20 | -0.03 | 0.00 | 0.20 | 6.20 |
| 23 | 1 | 1/15/10 | 7:00 PM | 9.0 | 90.0 | 55.0 | 45.0 | 31.4 | 34.1 | 0.10 | | 51.0 | 0.21 | 0.13 | 15.0 | 698 | 509 | 0.24 | -0.01 | 0.00 | 0.20 | 6.35 |
| 24 | 1 | 1/15/10 | 8:00 PM | 10.0 | 90.0 | 55.0 | 45.0 | 31.4 | 34.1 | 0.10 | | 54.0 | 0.23 | 0.15 | 15.0 | 712 | 509 | 0.28 | 0.01 | 0.00 | 0.20 | 6.50 |
| 25 | 1 | 1/15/10 | 9:00 PM | 11.0 | 90.0 | 55.0 | 45.0 | 31.4 | 34.1 | 0.10 | | 56.5 | 0.25 | 0.17 | 15.0 | 726 | 509 | 0.33 | 0.04 | 0.10 | 0.00 | 6.65 |
| 26 | 1 | 1/15/10 | 10:00 PM | 12.0 | 90.0 | 55.0 | 45.0 | 31.4 | 34.1 | 0.10 | | 59.1 | 0.27 | 0.20 | 15.0 | 740 | 509 | 0.37 | 0.06 | 0.10 | 0.00 | 6.80 |
| 27 | 1 | 1/15/10 | 11:00 PM | 13.0 | 90.0 | 55.0 | 45.0 | 31.4 | 34.1 | 0.10 | | 61.5 | 0.29 | 0.22 | 15.0 | 753 | 509 | 0.42 | 0.08 | 0.11 | 0.00 | 6.95 |
| 28 | 1 | 1/15/10 | 12:00 PM | 14.0 | 90.0 | 55.0 | 45.0 | 31.4 | 34.1 | 0.10 | | 63.9 | 0.32 | 0.25 | 15.0 | 766 | 509 | 0.47 | 0.10 | 0.12 | 0.00 | 7.10 |
| 29 | 1 | 1/16/10 | 1:00 AM | 15.0 | 90.0 | 55.0 | 45.0 | 31.4 | 34.1 | 0.10 | | 66.2 | 0.34 | 0.27 | 15.0 | 779 | 509 | 0.53 | 0.13 | 0.12 | 0.00 | 7.25 |
| 30 | 1 | 1/16/10 | 2:00 AM | 16.0 | 90.0 | 55.0 | 45.0 | 31.4 | 34.1 | 0.10 | | 68.4 | 0.37 | 0.30 | 15.0 | 792 | 509 | 0.58 | 0.15 | 0.13 | 0.00 | 7.40 |
| 31 | 1 | 1/16/10 | 3:00 AM | 17.0 | 90.0 | 55.0 | 45.0 | 31.4 | 34.1 | 0.10 | | 70.5 | 0.40 | 0.33 | 15.0 | 804 | 509 | 0.64 | 0.17 | 0.13 | 0.00 | 7.55 |
| 32 | 1 | 1/16/10 | 4:00 AM | 18.0 | 90.0 | 55.0 | 45.0 | 31.4 | 34.1 | 0.10 | | 72.5 | 0.42 | 0.35 | 15.0 | 816 | 509 | 0.70 | 0.19 | 0.14 | 0.00 | 7.70 |
| 33 | 1 | 1/16/10 | 5:00 AM | 19.0 | 90.0 | 55.0 | 45.0 | 31.4 | 34.1 | 0.10 | | 74.5 | 0.45 | 0.38 | 15.0 | 827 | 509 | 0.77 | 0.21 | 0.14 | 0.00 | 7.85 |
| 34 | 1 | 1/16/10 | 6:00 AM | 20.0 | 90.0 | 55.0 | 45.0 | 31.4 | 34.1 | 0.10 | | 76.3 | 0.48 | 0.41 | 15.0 | 838 | 509 | 0.85 | 0.23 | 0.15 | 0.00 | 8.00 |
| 35 | 1 | 1/16/10 | 7:00 AM | 21.0 | 90.0 | 55.0 | 45.0 | 31.4 | 34.1 | 0.10 | | 78.1 | 0.51 | 0.45 | 15.0 | 850 | 509 | 0.86 | 0.25 | 0.15 | 0.00 | 8.15 |
| 36 | 1 | 1/16/10 | 8:00 AM | 22.0 | 90.0 | 55.0 | 45.0 | 31.4 | 34.1 | 0.10 | | 80.0 | 0.54 | 0.45 | 15.0 | 863 | 509 | 0.87 | 0.28 | 0.00 | 0.20 | 8.30 |
| 37 | 1 | 1/16/10 | 9:00 AM | 23.0 | 90.0 | 55.0 | 45.0 | 31.4 | 34.1 | 0.10 | | 82.0 | 0.54 | 0.45 | 15.0 | 863 | 509 | 0.00 | 0.00 | 0.00 | 0.00 | 8.45 |

Fig. 7B

| | A | B | C | D | E | F | G | H | I | J | K | L | M | N | O | P | Q | R | S | T | U | V |
|---|---|---|---|---|---|---|---|---|---|---|---|---|---|---|---|---|---|---|---|---|---|---|
| 1 | | 1/16/10 | 9:01 AM | | | | | | | | | | | | | | | | | | | |
| 2 | | Area F2 | 2,400 | | | | | | | | | | | | | | | | | | | |
| 3 | | | 0 | | | | | | | | | | | | | | | | | | | |
| 4 | | lbs of water | 823,455 | | | | | | | | | | | | | | | | | | | |
| 5 | | Qh Btu's/hr | 2,460,000 | | | | | | | | | | | | | | | | | | | |
| 6 | | | 0 | | | | | | | | | | | | | | | | | | | |
| 7 | | ΔTh | 2.99 | | | | | | | | | | | | | | | | | | | |
| 8 | | Altitude feet | 2300 | | | | | | | | | | | | | | | | | | | |
| 9 | | | | | | | | | | | | | | | | | | | | | | |
| 10 | | sh5 | Finalnov 19 | | | | | Gr | | | | | | Pw- | | | | | | | | |
| 11 | | | | | | | | Note | | | | | | | | | | | | | | |
| 12 | | | | Vwf | Wmf | Ta | Rha | 3 | Tdp | Pdp | Tm | Tc | Pw | Pdp | Qr | Qs | ΔEn1 | K1 | L1 | K3 | K3 | Vwa |
| 13 | | | | [MPH] | [DEG] | [°F] | [%] | | [°F] | [PSI] | [°F] | [°F] | [PSI] | [PSI] | Btu's/hr | Btu's/hr | Btu's/hr | | | | | [MPH] |
| 14 | 1 | 1/15/10 | 10:00 AM | 0.0 | 90.0 | 55.0 | 45.0 | 31.4 | 34.1 | 0.1 | 64.5 | 22.0 | 0.29 | 0.17 | 0 | 160,782 | -1,235,183 | 54,258 | 19,200 | 24,076 | 5,760 | N/A |
| 15 | 1 | 1/15/10 | 11:00 AM | 1.0 | 90.0 | 55.0 | 45.0 | 31.4 | 34.1 | 0.1 | 63.0 | 25.4 | 0.27 | 0.16 | 0 | 160,782 | -1,235,183 | 49,720 | 15,600 | 22,063 | 4,680 | N/A |
| 16 | 1 | 1/15/10 | 12:00 PM | 2.0 | 90.0 | 55.0 | 45.0 | 31.4 | 34.1 | 0.1 | 61.5 | 26.7 | 0.26 | 0.15 | 0 | 160,782 | -1,235,183 | 45,392 | 12,000 | 20,142 | 3,600 | N/A |
| 17 | 1 | 1/15/10 | 1:00 PM | 3.0 | 90.0 | 55.0 | 45.0 | 31.4 | 34.1 | 0.1 | 60.0 | 32.1 | 0.24 | 0.13 | 0 | 160,782 | -1,235,183 | 41,265 | 8,400 | 18,311 | 2,520 | N/A |
| 18 | 1 | 1/15/10 | 2:00 PM | 4.0 | 90.0 | 55.0 | 45.0 | 31.4 | 34.1 | 0.1 | 58.5 | 35.4 | 0.23 | 0.12 | 0 | 160,782 | -1,235,183 | 37,330 | 4,800 | 16,565 | 1,440 | N/A |
| 19 | 1 | 1/15/10 | 3:00 PM | 5.0 | 90.0 | 55.0 | 45.0 | 31.4 | 34.1 | 0.1 | 57.0 | 38.6 | 0.22 | 0.11 | 0 | 160,782 | -1,235,183 | 37,330 | 1,200 | 16,565 | 360 | N/A |
| 20 | 1 | 1/15/10 | 4:00 PM | 6.0 | 90.0 | 55.0 | 45.0 | 31.4 | 34.1 | 0.1 | 55.5 | 41.8 | 0.21 | 0.11 | 0 | 160,782 | -1,235,183 | 37,330 | -2,400 | 16,565 | -720 | N/A |
| 21 | 1 | 1/15/10 | 5:00 PM | 7.0 | 90.0 | 55.0 | 45.0 | 31.4 | 34.1 | 0.1 | 54.0 | 44.9 | 0.21 | 0.11 | 0 | 160,782 | -1,235,183 | 37,218 | -2,400 | 16,515 | -720 | N/A |
| 22 | 1 | 1/15/10 | 6:00 PM | 8.0 | 90.0 | 55.0 | 45.0 | 31.4 | 34.1 | 0.1 | 54.0 | 48.0 | 0.21 | 0.11 | 0 | 160,782 | 0 | 44,218 | -2,400 | 19,581 | -720 | N/A |
| 23 | 1 | 1/15/10 | 7:00 PM | 9.0 | 90.0 | 55.0 | 45.0 | 31.4 | 34.1 | 0.1 | 54.0 | 51.0 | 0.21 | 0.13 | 0 | 160,782 | -36,063 | 51,413 | -2,505 | 22,814 | -752 | N/A |
| 24 | 1 | 1/15/10 | 8:00 PM | 10.0 | 90.0 | 55.0 | 45.0 | 31.4 | 34.1 | 0.1 | 54.0 | 54.0 | 0.23 | 0.15 | 81,047 | 0 | 2,134,485 | 59,054 | 3,716 | 26,205 | 1,115 | 6.65 |
| 25 | 1 | 1/15/10 | 9:00 PM | 11.0 | 90.0 | 55.0 | 45.0 | 31.4 | 34.1 | 0.1 | 56.5 | 56.5 | 0.25 | 0.17 | 86,193 | 0 | 2,074,826 | 67,027 | 9,763 | 29,742 | 2,929 | 6.80 |
| 26 | 1 | 1/15/10 | 10:00 PM | 12.0 | 90.0 | 55.0 | 45.0 | 31.4 | 34.1 | 0.1 | 59.1 | 59.1 | 0.27 | 0.20 | 91,246 | 0 | 2,012,980 | 75,300 | 15,630 | 33,414 | 4,689 | 6.95 |
| 27 | 1 | 1/15/10 | 11:00 PM | 13.0 | 90.0 | 55.0 | 45.0 | 31.4 | 34.1 | 0.1 | 61.5 | 61.5 | 0.29 | 0.22 | 96,193 | 0 | 1,949,084 | 83,841 | 21,311 | 37,203 | 6,393 | 7.10 |
| 28 | 1 | 1/15/10 | 12:00 PM | 14.0 | 90.0 | 55.0 | 45.0 | 31.4 | 34.1 | 0.1 | 63.9 | 63.9 | 0.32 | 0.25 | 101,025 | 0 | 1,883,304 | 92,609 | 26,800 | 41,094 | 8,040 | 7.25 |
| 29 | 1 | 1/16/10 | 1:00 AM | 15.0 | 90.0 | 55.0 | 45.0 | 31.4 | 34.1 | 0.1 | 66.2 | 66.2 | 0.34 | 0.27 | 105,730 | 0 | 1,815,827 | 101,563 | 32,092 | 45,067 | 9,628 | 7.40 |
| 30 | 1 | 1/16/10 | 2:00 AM | 16.0 | 90.0 | 55.0 | 45.0 | 31.4 | 34.1 | 0.1 | 68.4 | 68.4 | 0.37 | 0.30 | 110,300 | 0 | 1,746,857 | 110,659 | 37,183 | 49,103 | 11,155 | 7.55 |
| 31 | 1 | 1/16/10 | 3:00 AM | 17.0 | 90.0 | 55.0 | 45.0 | 31.4 | 34.1 | 0.1 | 70.5 | 70.5 | 0.40 | 0.33 | 114,727 | 0 | 1,676,764 | 119,816 | 42,070 | 53,167 | 12,621 | 7.70 |
| 32 | 1 | 1/16/10 | 4:00 AM | 18.0 | 90.0 | 55.0 | 45.0 | 31.4 | 34.1 | 0.1 | 72.5 | 72.5 | 0.42 | 0.35 | 118,998 | 0 | 1,606,063 | 128,930 | 46,751 | 57,211 | 14,025 | 7.85 |
| 33 | 1 | 1/16/10 | 5:00 AM | 19.0 | 90.0 | 55.0 | 45.0 | 31.4 | 34.1 | 0.1 | 74.5 | 74.5 | 0.45 | 0.38 | 123,054 | 0 | 1,529,460 | 139,192 | 51,209 | 61,765 | 15,363 | 8.00 |
| 34 | 1 | 1/16/10 | 6:00 AM | 20.0 | 90.0 | 55.0 | 45.0 | 31.4 | 34.1 | 0.1 | 76.3 | 76.3 | 0.48 | 0.41 | 127,443 | 0 | 1,444,660 | 150,960 | 55,420 | 66,987 | 16,625 | 8.15 |
| 35 | 1 | 1/16/10 | 7:00 AM | 21.0 | 90.0 | 55.0 | 45.0 | 31.4 | 34.1 | 0.1 | 78.1 | 78.1 | 0.51 | 0.45 | 0 | 0 | 1,543,856 | 150,960 | 59,919 | 66,987 | 17,976 | 8.30 |
| 36 | 1 | 1/16/10 | 8:00 AM | 22.0 | 90.0 | 55.0 | 45.0 | 31.4 | 34.1 | 0.1 | 80.0 | 80.0 | 0.54 | 0.45 | 0 | 160,782 | 1,674,639 | 150,960 | 64,800 | 66,987 | 19,440 | 8.45 |
| 37 | 1 | 1/16/10 | 9:00 AM | 23.0 | 90.0 | 55.0 | 45.0 | 31.4 | 34.1 | 0.1 | 82.0 | 82.0 | 0.54 | | 0 | 0 | 0 | 0 | 0 | 0 | 0 | N/A |
| 38 | | | | | | | | | | | | | | | 0.0 | 0.20 | 2.0 | 0.183 | 0.295 | 0.081 | 0.024 | |

Fig. 7C

| | A | B | C | D | E | F | G | H | I |
|---|---|---|---|---|---|---|---|---|---|
| 1 | sh6 | Finalnov 19 | | | | | | | |
| 2 | Vm | 90 | degrees | | | | | | |
| 3 | Vmin(a) | 5 | mph | | | | | | |
| 4 | WF(m) | 0.15 | | | | | | | |
| 5 | | | | | | | | | |
| 6 | Limit | 10 | mph | | | | | | |
| 7 | | | | | | | | | |
| 8 | | | Vwa | Vwa | Vwa | Vwa | Vwa | Sum | Vwc |
| 9 | | Vwf | [mph] | [mph] | [mph] | [mph] | [mph] | | [mph] |
| 10 | # | [mph] | a | b | c | d | e | | average |
| 11 | 0 | 0 | 5.0 | 5.0 | 5.0 | 5.0 | 5.0 | 25.0 | 5.0 |
| 12 | 0 | 1 | 5.2 | 5.2 | 5.2 | 5.2 | 5.2 | 25.8 | 5.2 |
| 13 | 0 | 2 | 5.3 | 5.3 | 5.3 | 5.3 | 5.3 | 26.5 | 5.3 |
| 14 | 0 | 3 | 5.5 | 5.5 | 5.5 | 5.5 | 5.5 | 27.3 | 5.5 |
| 15 | 0 | 4 | 5.6 | 5.6 | 5.6 | 5.6 | 5.6 | 28.0 | 5.6 |
| 16 | 0 | 5 | 5.8 | 5.8 | 5.8 | 5.8 | 5.8 | 28.8 | 5.8 |
| 17 | 0 | 6 | 5.9 | 5.9 | 5.9 | 5.9 | 5.9 | 29.5 | 5.9 |
| 18 | 0 | 7 | 6.1 | 6.1 | 6.1 | 6.1 | 6.1 | 30.3 | 6.1 |
| 19 | 0 | 8 | 6.2 | 6.2 | 6.2 | 6.2 | 6.2 | 31.0 | 6.2 |
| 20 | 0 | 9 | 6.4 | 6.4 | 6.4 | 6.4 | 6.4 | 31.8 | 6.4 |
| 21 | 0 | 10 | 6.5 | 6.5 | 6.5 | 6.5 | 6.5 | 32.5 | 6.5 |
| 22 | 0 | 12 | 6.8 | 6.8 | 6.8 | 6.8 | 6.8 | 34.0 | 6.8 |
| 23 | 0 | 14 | 7.1 | 7.1 | 7.1 | 7.1 | 7.1 | 35.5 | 7.1 |
| 24 | 0 | 16 | 7.4 | 7.4 | 7.4 | 7.4 | 7.4 | 37.0 | 7.4 |
| 25 | 0 | 18 | 7.7 | 7.7 | 7.7 | 7.7 | 7.7 | 38.5 | 7.7 |
| 26 | 0 | 20 | 8.0 | 8.0 | 8.0 | 8.0 | 8.0 | 40.0 | 8.0 |
| 27 | 0 | 22 | 8.3 | 8.3 | 8.3 | 8.3 | 8.3 | 41.5 | 8.3 |
| 28 | 0 | 24 | 8.6 | 8.6 | 8.6 | 8.6 | 8.6 | 43.0 | 8.6 |
| 29 | 0 | 26 | 8.9 | 8.9 | 8.9 | 8.9 | 8.9 | 44.5 | 8.9 |
| 30 | 0 | 28 | 9.2 | 9.2 | 9.2 | 9.2 | 9.2 | 46.0 | 9.2 |
| 31 | 0 | 30 | 9.5 | 9.5 | 9.5 | 9.5 | 9.5 | 47.5 | 9.5 |
| 32 | 0 | 32 | 9.8 | 9.8 | 9.8 | 9.8 | 9.8 | 49.0 | 9.8 |
| 33 | 0 | 34 | 10.1 | 10.1 | 10.1 | 10.1 | 10.1 | 50.5 | 10.1 |
| 34 | 0 | 36 | 10.4 | 10.4 | 10.4 | 10.4 | 10.4 | 52.0 | 10.4 |

Fig. 7D

| | A | B | C | D | E | F | G | H | I | J | K | L | M | N | O |
|---|---|---|---|---|---|---|---|---|---|---|---|---|---|---|---|
| 1 | sh7 | | | | | | | | | | | | | | |
| 2 | Finalnov 19 | | | | | | | | | | | | | | |
| 3 | | | | | | | | | | | | | | | |
| 4 | WBAB No. | 12842 | | | | | | | | | | | | | |
| 5 | | | | | | | | | | | | | | | |
| 6 | | | | Sunrise | Sunset | | | | | | | Daily | | | |
| 7 | | Tilt °0 | °317.2 | 24hr | 24hr | | | | | | Daily Rain | Clear | | | ΔTs |
| 8 | Month | kWh/m²/day | Btu/F²/day | Clock | Clock | Hours | Btu/F²/hr | Ap | Monthly Shade Factor | Screen Room Factor | Factor | Factor | Qs Btu's/hr | lbs H₂O | [°F] |
| 9 | Jan | 3.2 | 1015 | 7 | 19 | 12 | 85 | 2400 | 0.9 | 1 | 1 | 0.88 | 160,782 | 823,455 | 0.20 |
| 10 | Feb | 4.0 | 1269 | 7 | 19 | 12 | 106 | 2400 | 0.9 | 1 | | | 0 | 823,455 | 0.00 |
| 11 | Mar | 5.1 | 1618 | 7 | 19 | 12 | 135 | 2400 | 0.9 | 1 | | | 0 | 823,455 | 0.00 |
| 12 | Apr | 6.2 | 1967 | 7 | 19 | 12 | 164 | 2400 | 0.9 | 1 | | | 0 | 823,455 | 0.00 |
| 13 | May | 6.4 | 2030 | 7 | 19 | 12 | 169 | 2400 | 0.9 | 1 | | | 0 | 823,455 | 0.00 |
| 14 | Jun | 6.1 | 1935 | 7 | 19 | 12 | 161 | 2400 | 0.9 | 1 | | | 0 | 823,455 | 0.00 |
| 15 | Jul | 5.8 | 1840 | 7 | 19 | 12 | 153 | 2400 | 0.9 | 1 | | | 0 | 823,455 | 0.00 |
| 16 | Aug | 5.5 | 1745 | 7 | 19 | 12 | 145 | 2400 | 0.9 | 1 | | | 0 | 823,455 | 0.00 |
| 17 | Sep | 4.9 | 1554 | 7 | 19 | 12 | 130 | 2400 | 0.9 | 1 | | | 0 | 823,455 | 0.00 |
| 18 | Nov | 4.4 | 1396 | 7 | 19 | 12 | 116 | 2400 | 0.9 | 1 | | | 0 | 823,455 | 0.00 |
| 19 | Oct | 3.6 | 1142 | 7 | 19 | 12 | 95 | 2400 | 0.9 | 1 | | | 0 | 823,455 | 0.00 |
| 20 | Dec | 3.1 | 983 | 7 | 19 | 12 | 82 | 2400 | 0.9 | 1 | | | 0 | 823,455 | 0.00 |

Fig. 7E

| A | B | C | D | E | F | G | H | I | J | K | L | M | N | O | P | Q | R | S | T | U |
|---|---|---|---|---|---|---|---|---|---|---|---|---|---|---|---|---|---|---|---|---|
| Wx | | Rise | Set | | Open hr | 9:00 | | | | | | | | | | | | | | Clear |
| 1/20/10 | Sun | Hours | Hours | | Closed hr | 21:00 | | | | | | | | | | | | | | Sky |
| Finalnov 19 | | 7 | 19 | | # hrs | 12 | | | | | | | | | | | | | | Factor |
| | | | | | Wmf | | | | | | | | Vwf | | | | | | | |
| | | | Sch. | Vwf | [DEG] | Ta | Rha | Tdp | Rain | Vwf | Ta | Rain | Limit | A Sch. | B Wind | C Temp. | D Rain | E ABCD | | |
| Hour | Day | Time | open | [MPH] | mag. | [°F] | [%] | [°F] | [%] | [MPH] | [°F] | [%] | [MPH] | Logic | Logic | Logic | Logic | | | |
| 1 | 1 | 0:00 | No | 15 | 90 | 55 | 45 | 34.1 | 0 | | | | | 0 | 0 | 0 | 0 | 0 | | |
| 2 | 1 | 1:00 | No | 15 | 90 | 55 | 45 | 34.1 | 0 | | | | | 0 | 0 | 0 | 0 | 0 | | |
| 3 | 1 | 2:00 | No | 15 | 90 | 55 | 45 | 34.1 | 0 | | | | | 0 | 0 | 0 | 0 | 0 | | |
| 4 | 1 | 3:00 | No | 15 | 90 | 55 | 45 | 34.1 | 0 | | | | | 0 | 0 | 0 | 0 | 0 | | |
| 5 | 1 | 4:00 | No | 9 | 90 | 55 | 45 | 34.1 | 0 | | | | | 0 | 0 | 0 | 0 | 0 | | |
| 6 | 1 | 5:00 | No | 9 | 90 | 55 | 45 | 34.1 | 0 | | | | | 0 | 0 | 0 | 0 | 0 | | |
| 7 | 1 | 6:00 | No | 9 | 90 | 55 | 45 | 34.1 | 0 | | | | | 0 | 0 | 0 | 0 | 0 | | |
| 8 | 1 | 7:00 | No | 15 | 90 | 55 | 45 | 34.1 | 0 | | | | | 0 | 0 | 0 | 0 | 0 | | 1.0 |
| 9 | 1 | 8:00 | No | 15 | 90 | 55 | 45 | 34.1 | 0 | | | | | 0 | 0 | 0 | 0 | 0 | | 0.8 |
| 10 | 1 | 9:00 | Yes | 5 | 90 | 55 | 45 | 34.1 | 0 | 5 | 55 | 0 | 10 | 1 | 1 | 1 | 1 | 1 | | 0.5 |
| 11 | 1 | 10:00 | Yes | 5 | 90 | 58 | 45 | 34.1 | 0 | 5 | 58 | 0 | 10 | 1 | 1 | 1 | 1 | 1 | | 0.8 |
| 12 | 1 | 11:00 | Yes | 5 | 90 | 61 | 45 | 34.1 | 0 | 5 | 61 | 0 | 10 | 1 | 1 | 1 | 1 | 1 | | 0.8 |
| 13 | 1 | 12:00 | Yes | 5 | 90 | 64 | 45 | 34.1 | 0 | 5 | 64 | 0 | 10 | 1 | 1 | 1 | 1 | 1 | | 0.8 |
| 14 | 1 | 13:00 | Yes | 5 | 90 | 67 | 45 | 34.1 | 0 | 5 | 67 | 0 | 10 | 1 | 1 | 1 | 1 | 1 | | 0.8 |
| 15 | 1 | 14:00 | Yes | 5 | 90 | 70 | 45 | 34.1 | 0 | 5 | 70 | 0 | 10 | 1 | 1 | 1 | 1 | 1 | | 1.0 |
| 16 | 1 | 15:00 | Yes | 15 | 90 | 73 | 45 | 34.1 | 0 | 15 | 73 | 0 | 10 | 1 | 1 | 1 | 1 | 1 | | 0.8 |
| 17 | 1 | 16:00 | Yes | 8 | 90 | 76 | 45 | 34.1 | 0 | 8 | 76 | 0 | 10 | 1 | 1 | 1 | 1 | 1 | | 0.8 |
| 18 | 1 | 17:00 | Yes | 15 | 90 | 79 | 45 | 34.1 | 0 | 15 | 79 | 0 | 10 | 1 | 1 | 1 | 1 | 1 | | 0.8 |
| 19 | 1 | 18:00 | Yes | 15 | 90 | 82 | 45 | 34.1 | 0 | 15 | 82 | 0 | 10 | 1 | 1 | 1 | 1 | 1 | | 0.8 |
| 20 | 1 | 19:00 | Yes | 15 | 90 | 85 | 45 | 34.1 | 0 | 15 | 85 | 0 | 10 | 1 | 1 | 1 | 1 | 1 | | 0.8 |
| 21 | 1 | 20:00 | Yes | 15 | 90 | 82 | 45 | 34.1 | 0 | 15 | 82 | 0 | 10 | 1 | 1 | 1 | 1 | 1 | | |
| 22 | 1 | 21:00 | No | 15 | 90 | 79 | 45 | 34.1 | 0 | | | | | 0 | 0 | 0 | 0 | 0 | | |
| 23 | 1 | 22:00 | No | 15 | 90 | 76 | 45 | 34.1 | 0 | | | | | 0 | 0 | 0 | 0 | 0 | | |
| 24 | 1 | 23:00 | No | 15 | 90 | 73 | 45 | 34.1 | 0 | | | | | 0 | 0 | 0 | 0 | 0 | | |
| | | | | | | | | | Sum | 113 | 852 | 0 | 120 | | | | | | Number | 10.50 |
| | | | | | | | | | Avg | 9 | 71 | 0 | 10 | | | | | | | 0.88 |
| | | | | | | | | | Limit | 10 | 70 | 80 | 10 | | | | | | | |
| | | | | | | | | | Logic | 1 | 1 | 1 | 1 | | | | | | | |

Fig. 7F

| | A | B | C | D | E | F | G | H | I | J | K | L | M | N | O | P | Q | R | S |
|---|---|---|---|---|---|---|---|---|---|---|---|---|---|---|---|---|---|---|---|
| 1 | Finalnov 19 | | | | | | | | | | | | | | | | | | |
| 2 | | | | | | | | | | | | | | | | | | | |
| 3 | Vwm# | | | | | | | | | | | | | | | | | | |
| 4 | Time # | | | | | | | | | | Pw-Pdp | | | | | | | | |
| 5 | | | Vwf | 0.00 | 0.05 | 0.10 | 0.15 | 0.20 | 0.25 | 0.30 | 0.35 | 0.40 | 0.45 | 0.50 | 0.60 | 0.70 | 0.80 | 0.90 | 1.00 |
| 6 | | | 1 | | | | | | | | | | | | | | | | |
| 7 | | | 2 | | | | | | | | | | | | | | | | |
| 8 | | | 3 | | | | | | | | | | | | | | | | |
| 9 | | | 4 | | | | | | | | | | | | | | | | |
| 10 | | | 5 | | | | | | | | | | | | | | | | |
| 11 | | | 6 | | | | | | | | | | | | | | | | |
| 12 | | | 7 | | | | | | | | | | | | | | | | |
| 13 | | | 8 | | | | | | | | | | | | | | | | |
| 14 | | | 9 | | | | | | | | | | | | | | | | |
| 15 | | | 10 | | | | | | | | | | | | | | | | |
| 16 | | | 12 | | | | | | | | | | | | | | | | |
| 17 | | | 14 | | | | | | | | | | | | | | | | |
| 18 | | | 16 | | | | | | | | | | | | | | | | |
| 19 | | | 18 | | | | | | | | | | | | | | | | |
| 20 | | | 20 | | | | | | | | | | | | | | | | |
| 21 | | | 22 | | | | | | | | | | | | | | | | |
| 22 | | | 24 | | | | | | | | | | | | | | | | |
| 23 | | | 26 | | | | | | | | | | | | | | | | |
| 24 | | | 28 | | | | | | | | | | | | | | | | |
| 25 | | | 30 | | | | | | | | | | | | | | | | |
| 26 | | | 32 | | | | | | | | | | | | | | | | |
| 27 | | | 34 | | | | | | | | | | | | | | | | |
| 28 | | | 36 | | | | | | | | | | | | | | | | |

Fig. 7G

| | A | B | C | D | E | F | G | H | I |
|---|---|---|---|---|---|---|---|---|---|
| 1 | Finalnov 19 | | | | | | | | |
| 2 | | | | | | | | | |
| 3 | | | | | | | | | |
| 4 | | | | | | | | | |
| 5 | | | Wmf | X-Y | | | | Wmf | X-Y |
| 6 | | Time # | [DEG] mag. | Number | | Time | Time # | [DEG] mag. | Number |
| 7 | Time | | | | | | | | |
| 8 | 00:01 to 06:00 | 1 | 22.5 | 1 | | | | | |
| 9 | 00:01 to 06:00 | 1 | 67.5 | 2 | | | | | |
| 10 | 00:01 to 06:00 | 1 | 112.5 | 3 | | | | | |
| 11 | 00:01 to 06:00 | 1 | 157.5 | 4 | | | | | |
| 12 | 00:01 to 06:00 | 1 | 202.5 | 5 | | | | | |
| 13 | 00:01 to 06:00 | 1 | 247.5 | 6 | | | | | |
| 14 | 00:01 to 06:00 | 1 | 292.5 | 7 | | | | | |
| 15 | 00:01 to 06:00 | 1 | 337.5 | 8 | | | | | |
| 16 | | | | | | | | | |
| 17 | 06:01 to 12:00 | 2 | 22.5 | 9 | | 12:01 to 18:00 | 3 | 22.5 | 17 |
| 18 | 06:01 to 12:00 | 2 | 67.5 | 10 | | 12:01 to 18:00 | 3 | 67.5 | 18 |
| 19 | 06:01 to 12:00 | 2 | 112.5 | 11 | | 12:01 to 18:00 | 3 | 112.5 | 19 |
| 20 | 06:01 to 12:00 | 2 | 157.5 | 12 | | 12:01 to 18:00 | 3 | 157.5 | 20 |
| 21 | 06:01 to 12:00 | 2 | 202.5 | 13 | | 12:01 to 18:00 | 3 | 202.5 | 21 |
| 22 | 06:01 to 12:00 | 2 | 247.5 | 14 | | 12:01 to 18:00 | 3 | 247.5 | 22 |
| 23 | 06:01 to 12:00 | 2 | 292.5 | 15 | | 12:01 to 18:00 | 3 | 292.5 | 23 |
| 24 | 06:01 to 12:00 | 2 | 337.5 | 16 | | 12:01 to 18:00 | 3 | 337.5 | 24 |
| | | | | | | 18:01 to 00:00 | 4 | 22.5 | 25 |
| | | | | | | 18:01 to 00:00 | 4 | 67.5 | 26 |
| | | | | | | 18:01 to 00:00 | 4 | 112.5 | 27 |
| | | | | | | 18:01 to 00:00 | 4 | 157.5 | 28 |
| | | | | | | 18:01 to 00:00 | 4 | 202.5 | 29 |
| | | | | | | 18:01 to 00:00 | 4 | 247.5 | 30 |
| | | | | | | 18:01 to 00:00 | 4 | 292.5 | 31 |
| | | | | | | 18:01 to 00:00 | 4 | 337.5 | 32 |

Fig. 7H

| | A | B |
|---|---|---|
| 1 | Finalnov 19 | |
| 2 | | |
| 3 | | |
| 4 | | |
| 5 | Wmf | Vw Matrix Number |
| 6 | [DEG] | |
| 7 | mag. | |
| 8 | 22.5 | 1 |
| 9 | 67.5 | 2 |
| 10 | 112.5 | 3 |
| 11 | 157.5 | 4 |
| 12 | 202.5 | 5 |
| 13 | 247.5 | 6 |
| 14 | 292.5 | 7 |
| 15 | 337.5 | 8 |

SWIMMING POOL AND SPA HEATER CONTROL SYSTEM AND METHOD

CROSS REFERENCE TO RELATED APPLICATIONS

This application claims priority to U.S. Provisional Application Ser. No. 60/436,972 entitled "Swimming Pool Control System and Method" filed on Dec. 31, 2002. Priority is claimed to this prior application and the entirety thereof is incorporated herein by reference.

FIELD OF INVENTION

The present invention relates generally to a system for use in heating commercial and residential swimming pools or spas. More particularly the present invention relates to a system and method that controls the temperature of the water within such structures in a manner that saves energy by heating the water therein only when future weather conditions indicate that it will be feasible and cost effective to do so, in an automated process that depends upon the forecast and actual weather as well as information collected at the pool or spa. The present invention also utilizes prior actual experience in heating the pool or spa to subsequently improve the process over time.

BACKGROUND OF THE INVENTION

Millions of swimming pools and spas exist nationwide in both commercial and residential settings. In order for the use of such pools and spas to be a pleasurable experience for the user, (collectively referred to hereafter as a pool or pools), they should be kept to within a relatively narrow temperature range. In order to accomplish this, most pools and virtually all larger and commercial operated pools employ various types of heaters at any place where the ambient air temperature is below the pool water temperature required for swimming. Heating a large body of water consumes a great deal of energy. This translates into a large expense in the overall operation of the pool.

Heating of the water in swimming pools is further complicated by the fact that some of the heated pools are outdoors and therefore exposed to the ambient outdoor temperatures and other weather conditions. It is not uncommon for a temperature variation in a given day to be twenty degrees or more. It is usually desired to heat the water in the pool to a temperature significantly higher than the minimum daily outdoor temperature. A large amount of heating energy must therefore be used on a daily basis to maintain the pool at a temperature that is acceptable for use. This results in a high potential for wasting energy.

This problem in potential energy waste is further compounded when the pool is heated during periods of unusually cool weather or during seasons where the weather is mixed. In such seasons, there may be months that have virtually an equal number of days that are suitable for swimming and days that are unsuitable for doing so. Several days in succession that are not suitable for swimming may occur as a result of an extended cold spell. Alternatively, single days where the ambient temperature and/or wind conditions are unsuitable for swimming may occur sporadically throughout a given week or month.

Thermostatic control devices are commonly used with swimming pool heaters. These devices generally check the temperature of the water in the swimming pool on a regular basis and cause the heaters to cycle on or off when the temperature of the pool water goes above or below a pre-selected value. Thermostatic control systems are quite useful when the weather is consistently swimmable. Thermostatic control systems have, however, proven to be inefficient in situations where there are large differences in the ambient temperature over a given time period or where it is expected that the ambient temperature or other weather conditions will be unsuitable for swimming for a period of one or more days. In such situations, since the reduced temperatures would significantly lower the temperature of the pool water, the thermostatic control would tend to keep the heaters continuously on in order to attempt to counteract this environmental condition.

This operation can turn out to be a potentially futile and wasteful exercise since the conditions in upcoming weather may be such that the heaters either cannot achieve or maintain the pre-desired minimum pool water temperature. Even if the thermostatic control can maintain the pre-desired minimum temperature, ambient weather conditions may not be suitable for swimming during scheduled operating hours since the thermostat does not know these facts and a complete waste of energy can result.

Some thermostatic control systems for swimming also take into account the time of the day and turn the heaters on or off at pre-selected times. Such systems also suffer from the same lack of information regarding the actual and future weather conditions that the pool will face. The heating of pools by these systems is entirely unrelated to whether the future weather conditions at the time of the next scheduled opening of the pool will be favorable for swimming.

Several prior solutions to these problems have been proposed but each has had its shortcomings. For example, at one known location, the solution to the mixed weather encountered has been to heat the pool twenty-four hours a day, seven days a week regardless of the weather. When the weather was suitable for swimming, the pool water was generally warm enough as a result of such a heating routine. Although this was effective in most instances to maintain the pool water temperature at a usable level, tremendous amounts of energy were wasted by heating the pool in vain when the ambient temperature and/or wind conditions were not favorable enough to use the pool. The major reason that the pools were not used for swimming was cold weather and high winds. Use of this brute force-heating regimen usually resulted when a pool operator's prior attempts to control energy use had failed. In the winter months when the energy usage was highest, this pool was used less than half the time due to the temperature or the wind.

Other proposed solutions have installed various devices in an attempt to save energy. Such devices, in effect, shut the heaters off for part of the day based on an ambient temperature that the pool operator pre-selected. The ambient temperature selected by the pool operators was close to the average temperature in the winter months at that location. Most of these devices accomplished at least some minimal energy savings when compared to heating the pool on a continuous basis. The drawbacks of such devices however have been that they have seldom heated the pool water to a temperature high enough for swimming in the winter months.

This procedure often introduced other drawbacks since it utilized only ambient temperature as a control condition and didn't take the pool water temperature into account. For example, when the temperature of the pool water went down from a cold spell, the heaters very often could not reheat the pool within the reasonable time, because the heaters could not catch up by being on only part time. This condition of water that was too cold to swim in could go on for several days until the weather got unseasonably warm and/or until the cycling of the pool heaters could sufficiently increase the temperature of the water. Although this device at times saved more energy, it effectively prohibited the pool water temperature from being high enough for swimming unless several warm days occurred in a row. As such, on many days where the ambient temperature was high enough to permit swimming, the water was not, resulting in a nearly complete waste of energy in heating the pool.

More sophisticated attempts to overcome these problems have also been attempted. Automatic control systems have been used that would sense either the temperature of the pool water and/or the ambient temperature and turn the heaters off when the temperature dropped below a certain point. Such systems, however, contemplated only the then current temperature and not any future potential variations in the weather over any time periods. Other such systems have involved computer control systems that continuously monitor existing outside temperature and modify the operation of pool heaters accordingly based upon the then current weather conditions. Such devices have also been able to take into account the time of day or the day of the week in determining whether the heaters should be in an on or off condition but do not utilize forecast data or prior experience in heating the pool. These devices likewise make use of only current and not future weather conditions.

Some electronic control systems have been used in devices such as crop irrigation systems that have utilized weather forecast data to determine, for example, when to turn the system on. Such systems simply check whether rain is forecast for the next day in determining whether to turn the water on in the time period just prior to that day. These systems do not monitor soil moisture conditions, continuously monitor the forecast for change, take into account the amount of forecast rain or record and utilize past performance data and we therefore do not contemplate their suitability for use or adaptation for use of such systems in swimming pools. It is apparent therefore that a need exists for an improved system and method for controlling the heating of a swimming pool that appropriately utilizes factors such as future forecast data and past performance of the system in determining when the heaters can be turned off to save energy and thereafter when to turn the heaters on to ensure that the pool water will be sufficiently heated to permit swimming when the ambient temperature and/or other weather conditions are sufficient to do so.

SUMMARY OF THE INVENTION

The present invention provides an improved control system for heating the water in swimming pools in a cost and energy efficient manner. It is intended that the system and method of the present invention heat the swimming pools when the weather at a pre-selected time in the future will be suitable for swimming and that the system not waste energy heating the pool when the weather is not or will not be suitable for swimming over an extended period of time. It is intended that the system save energy outside the swimming pool operating hours by shutting the heaters down and turning the heaters back on using essentially the same procedures.

Using forecast weather data, the system continuously looks for times in the future when ambient weather conditions will not meet the minimum user pre-selected conditions for swimming at the next opening time for the pool. When such an event is detected and it is verified that there is sufficient time for the normal pool heating cycle to be interrupted, the system shuts off the pool heater. The system takes into account forecast weather data and then calculates the time required to raise the water temperature to a pre-selected (swimmable) operating temperature at a predetermined time in the future by calculating the number of hours required to sufficiently raise the temperature to the pre-selected level. The system accomplishes this by factoring in the weather conditions that are predicted to occur from the time that it shuts off until the time that the pool needs to be ready for operation. The heaters are then turned on at the appropriately calculated time and left on until the next scheduled opening time for the pool when conditions will be favorable for swimming.

The present invention also has the application and capability to shut pool heaters off when they are not needed based on the operating hours of the pool. The system otherwise operates normally and calculates when to turn the heaters on, prior to opening, to have the correct temperature for the next scheduled opening. The system is then improved or self corrected by recording the temperature of the water as it is heated and simultaneously recording the forecast weather conditions from the same place as the variables used to store and recall the measured data. This information measured is used to improve the calculation for future times that encounter these same forecast weather conditions. Forecast weather is used to store and recall measured data.

Except for a short time during start-up, a mature installation of this invention simply measures the change in water temperature for a given set of conditions and using this information to predict how long to heat the pool, beginning at a time in the future, under the same conditions. The system uses multiple spreadsheets to track the independent variables; time of day, wind direction, wind velocity, and vapor pressures as the independent variables used. The independent variables of temperature, humidity and altitude are included in the vapor pressure number. The procedures and equations used are set forth in detail below. These and other objects of the invention are provided in a swimming pool control system and method having a heater with a control mechanism, comprising the steps of establishing and recording a minimum temperature, a maximum wind speed, pool water temperature and a plurality of times and dates in the future that will permit use of said pool; checking the forecast weather for a first future time period and comparing the forecast air temperature and wind speed against said air temperature and wind speed from said establishing step for said time period to determine if they will not permit use of said pool for any of said times and dates established in said establishing step within said first future time period and recording the first said unpermitted time and date; determining the next time and date in said first future time period that is after said first unpermitted time and date recorded in said checking step that will permit use of said pool by comparing the forecast air temperature and wind speed for the remainder of said first future time period to said air temperature and wind speed from said establishing step and recording any said next time and date; calculating the time required for said heater to heat the pool water to said temperature from said establishing step prior to said next time and date that will permit use of said pool from said determining step and predicting the temperature of the water in the pool for all times between the current time and date and said next time and date that will permit use of said pool from said determining step utilizing the forecast weather for this time period; measuring the temperature of the pool water; periodically comparing the measured pool water temperature from said measuring step and said predicted pool water temperature from said calculating step for the same time; overriding the heater control mechanism and causing the heater to be turned off if said checking step records a first unpermitted time and date and said measured pool water temperature is greater than said predicted pool water temperature and thereafter causing said heater to be turned on if said measured pool water temperature is not greater than said predicted pool water temperature and returning control to said heater control mechanism at said next time and date that will permit use of said pool from said determining step.

BRIEF DESCRIPTION OF THE DRAWINGS

These and other aspects of the invention will become better understood from the following detailed description of various embodiments, when taken in conjunction with the drawings wherein:

FIG. 6 is a graphical illustration of the operation of a single cycle of one embodiment of the present invention;

FIG. 7A is an illustration of an exemplary spreadsheet calculation for determining Tc in accordance with one embodiment of the present invention;

FIG. 7B is an illustration of an exemplary spreadsheet calculation for calculating Vwa and recording Tm in accordance with one embodiment of the present invention;

FIG. 7C is an illustration of an exemplary spreadsheet calculation for determining one of the Vw matrix with start-up values.

FIG. 7D is an illustration of an exemplary spreadsheet calculation for solar radiation energy in accordance with one embodiment of the present invention;

FIG. 7E is an illustration of an exemplary spreadsheet calculation for forecast weather inputs and hourly logic in accordance with one embodiment of the present invention;

FIG. 7F is an illustration of an exemplary spreadsheet for one X-Y matrix for determining Vwf vs. Pw-Pdp in accordance with one embodiment of the present invention;

FIG. 7G is an illustration of an exemplary spreadsheet detailing X-Y matrix numbers in accordance with one embodiment of the present invention;

FIG. 7H is an illustration of an exemplary spreadsheet illustrating Vw (velocity of the wind) matrix numbers.

DETAILED DESCRIPTION OF CERTAIN PREFERRED EMBODIMENTS

Figure 1:
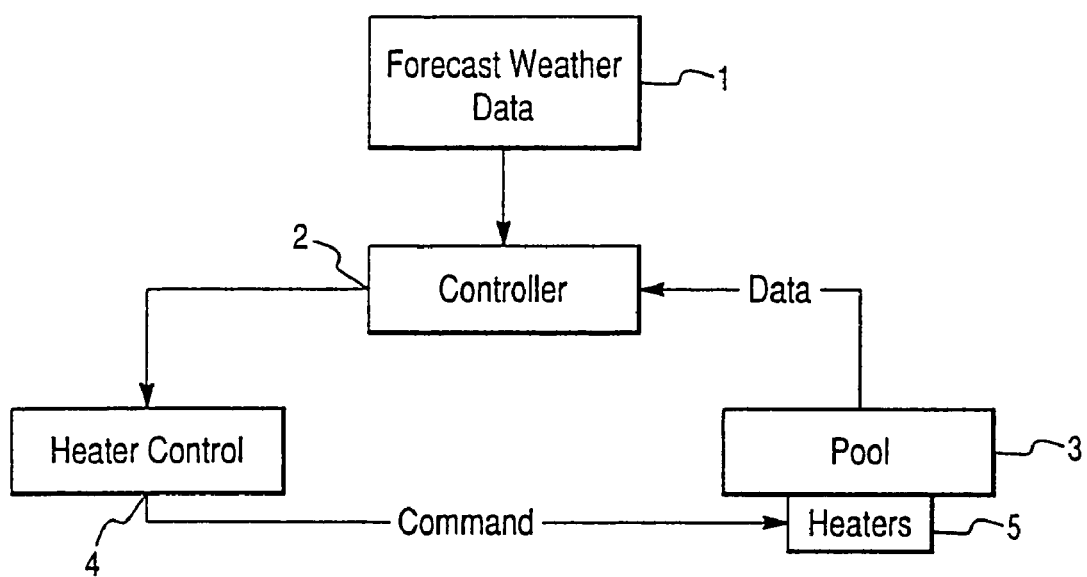
FIG. 1 is a schematic diagram for the general system of one embodiment of the present invention.

Certain preferred embodiments of the present invention will now be described in detail. The embodiments set forth below describe the present invention in connection with a system and method for controlling the heating of swimming pools. These embodiments are only exemplary and are not meant to be limiting. It should be understood that the present invention can be used to achieve equally beneficial results in spas and other similar recreational bodies of water in addition to swimming pools. The terms pool or pools as used throughout this document should be interpreted to mean any pool, spa or any similar enclosed recreational body of water.

The present invention is based upon several fundamental premises. Swimming pools in some cases are heated but not used. When a swimming pool is heated but not used, energy is wasted. Much of the wasted energy comes from evaporation of the water, so water is also lost. Minimizing wasted energy in the heating of swimming pools is important. If pools are not used because of prevailing or forecast weather conditions such as low temperature or high winds, this is measurable or predictable. The heaters can be shut off in anticipation of the forecast weather resulting in a tremendous potential energy savings. Determining when the future weather will be suitable for swimming during the operating hours of the pool is predictable, based upon the weather forecast. If pools are not used during certain hours (overnight for instance) the same principles can be applied, resulting in potentially significant energy savings without interfering with the next scheduled opening.

The number of hours that it would take to heat a swimming pool to a specified temperature at a specified future time given the intervening forecast weather conditions can be calculated. The calculated time can be used to turn the heaters on in advance of the next scheduled opening of the pool that will coincide with weather conditions that will be suitable for swimming. The water temperature of the pool and the current weather can be measured and recorded and cross-referenced with time and date data for each heating cycle. The recorded information can be used to improve the theoretical calculations initially utilized to heat the pool. In this manner, the heating calculations are continuously improved based upon real world experience where the swimming pool becomes its own laboratory. By considering multiple issues simultaneously the controller effectively manages the pool.

The major savings in energy permitted by the present invention will be for pools that can be effectively shut down and restarted timely for major changes in the weather. Some pools, such as lap pools used by master swimmers are required every day almost regardless of the weather. The present invention still permits a saving in energy to be accomplished in these situations. If the pool is closed at night the present invention can shut the heaters off and save energy for most nights. Any time the heaters are off and the pool can be reheated in time for usage energy will be saved. A cooler body, the less heated swimming pool will lose less energy than a warmer swimming pool. In general any time the heaters can be off and the pool still be ready for the next scheduled opening energy will be saved.

Figure 2:
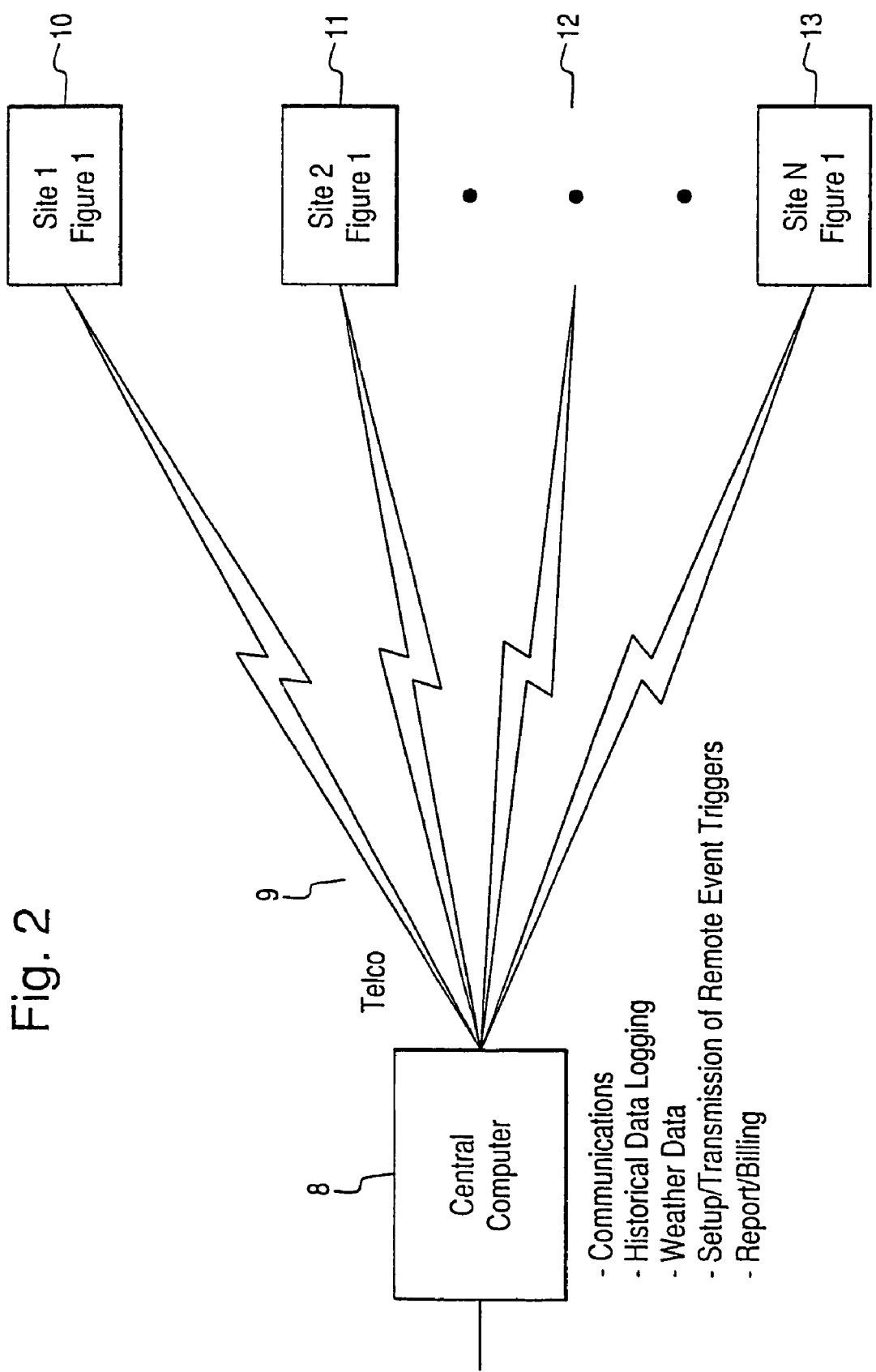
FIG. 2 is a schematic diagram for the general system of one embodiment of the present invention.

FIGS. 1 and 2 illustrate schematic diagrams for two embodiments of the general system of the present invention. It should be understood that the various general and detailed embodiments described herein are only exemplary and not intended to be limiting. Individual elements and subroutines of the system will be described in detail following this general description. The present invention does not require existing pool equipment to be modified except to allow for interruptions of the signals to the heaters that call for heat and for the insertion of a computer controlled apparatus to measure the pool's water temperature. The present invention utilizes a controller 2 that does not directly control the heaters 5 or the swimming pool 3. The controller 2 can be located at the pool site or more preferably at a less hostile remote location in communication with the pool heater control 4 via the internet, wireless, hardwire or other similar known on demand communications link. The controller 2 of the present invention can be implemented with software or the like, using a computer, such as Penguin Computing Relion® or Dell Dimension 400® or other device containing a similar central processing unit (CPU).

Figure 5:
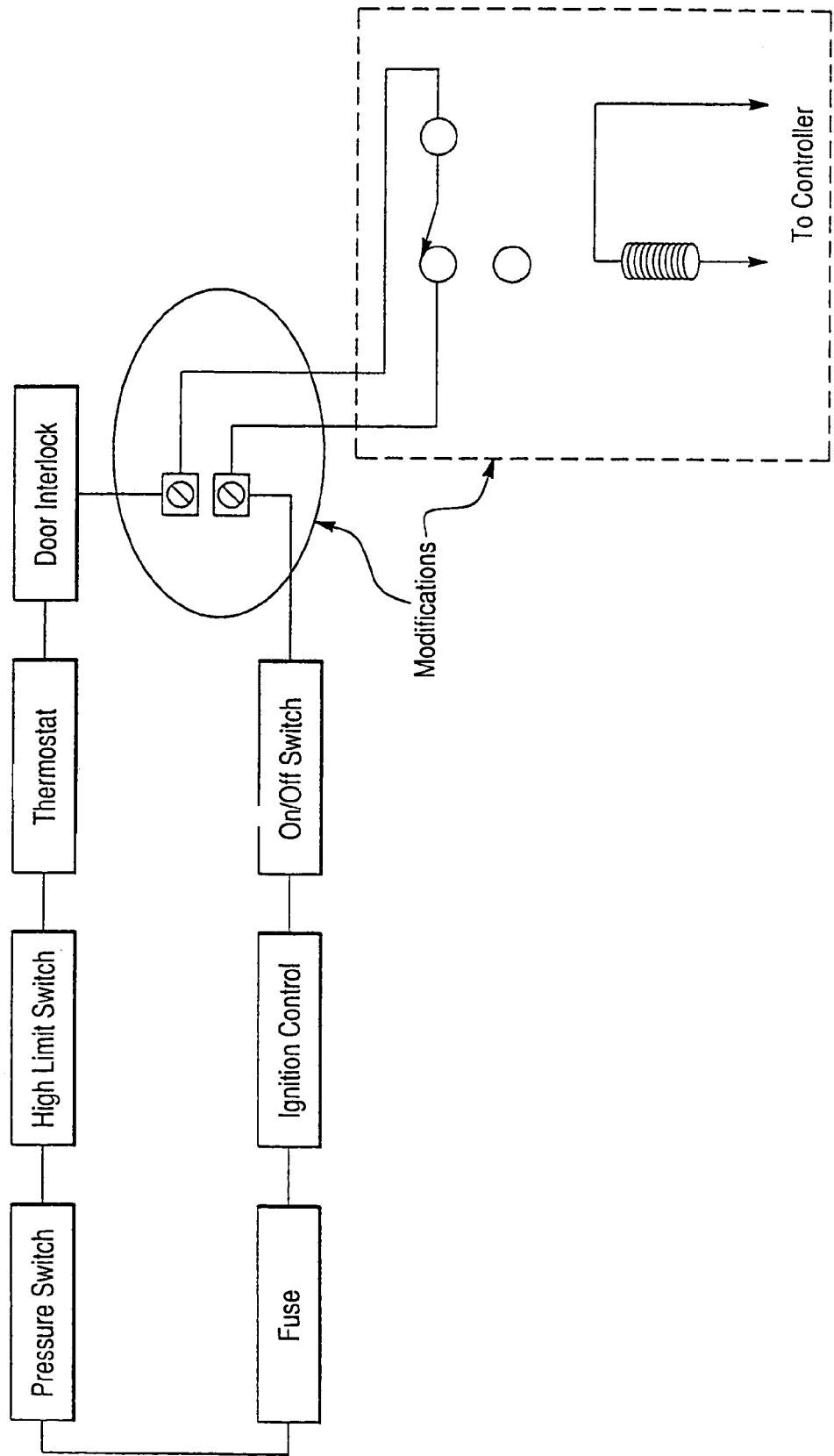
FIG. 5 is a schematic diagram of a control/limit system and modification of an existing pool heater in accordance with one embodiment of the present invention.

As illustrated in FIG. 1, the controller 2 can receive water temperature data from the pool 3 on a continuous basis at any time it chooses to do so. Similarly the controller 2 also receives weather data generally indicated at 1, which includes forecast weather that is often provided in periodic intervals. The heaters 5 are controlled by standard equipment such as a thermostatic or similar control system generally designated at 5 usually furnished by the heater manufacturer. The heater control is a serial line that can be interrupted by a variety of well known controls such as the thermostat, interlocks and multiple safety devices. This serial line is broken by the controller 2 and a relay, such as J-Works model JSB-210 in known fashion. One such typical system is illustrated in FIG. 5. A relay is furnished for each heater with a separate control line.

The controller 2 interrupts and overrides the commands from the control system 4 only when the controller determines that an event is present as defined by the system that necessitates such action. When no such event is present, the controller is in its non-activated condition. In this condition the pool heaters 5 and the heater control 4 operate based on that equipment alone. When the controller is not activated it is as if it is invisible to the system. The controller 2 activates and deactivates in response to events it detects in order to control the pool heating efficiency. An example of such an event would be when the combined data indicates that there will be an upcoming cold spell such that the ambient temperature and/or wind conditions will not be suitable for swimming at a preselected time in the future such as the next scheduled opening of the pool.

The controller 2 contains a set of criteria that has been pre-selected by the operator of a swimming pool in order to determine whether an event is present. The criteria can include, for example, the operating hours for the pool, the minimum temperature and maximum wind speed to permit the pool to be used during scheduled operating hours. The controller 2 receives and monitors temperature data on demand from the pool 3 and weather data 1 which is combined, correlated and compared to the pre-selected criteria in order to decide whether to interrupt the normal heating cycle of the pool heaters. If the controller 2 determines that an event is present (that is the pool is not needed or conditions will not be favorable to swimming at a time in the future that forecast data is available for and the heaters can be shut down) a short-cycling test and pool recovery time test are completed prior to overriding the heater control.

The pool recovery test determines that the measured pool water temperature in current time, Tm, is greater than the calculated pool water temperature projected to the current time, Tc. This means that there is more time between the points B and A as illustrated in FIG. 6 than needed to heat the pool. The short-cycle test simply confirms that the time between shut down (current time $B^1$ in FIG. 6) and the next scheduled opening with swimmable weather conditions ($A^1$ in FIG. 6) is greater than two hours. If either test criteria is not met the controller 2 will not interrupt the heater control 4 and will not cause the heaters 5 to be shut down. If both tests are met, the controller 2 overrides any existing command from the heater control 4 and causes the heaters 5 to shut down the controller 2 then begins its routine to determine when the heaters should be enabled so that the pool temperature will be brought up to a preselected temperature to permit swimming at a time in the future when the ambient weather conditions will likewise be favorable.

Energy efficiency is achieved by not heating the pool when it will not be used due to unfavorable weather conditions. Further efficiency is achieved by heating the pool only as long as is necessary to bring the pool temperature to a preselected level at a given opening time. During the time that the controller 2 interrupts the command from the heater control 5 and turns the heaters off, the controller compares the current measured pool water temperature Tm to the calculated pool water temperature Tc projected to the current time. If Tm is greater than Tc at the current time, the event continues with the heaters off. If Tm is equal to or less than Tc the heaters are turned on. The controller monitors for any changes to its initial calculation and resulting decision as to the time to turn the pool heaters back on. The ambient weather (present and past) conditions at the pool are reflected in the measured pool water temperature Tm. Once the controller 2 causes the heaters to be turned back on, they generally remain on with the controller monitoring and recording the pool temperature Tm and forecast weather conditions until the next scheduled opening time of the pool when the ambient weather conditions will be favorable for swimming. At that time the controller 2 deactivates and returns to its non-activating monitoring stage and the heaters 5 operate in accordance with commands from the heater control 4 until and unless the controller 2 senses another event present that would cause an override of the heater control 4.

As illustrated in FIG. 2, a central station 8 that is capable of monitoring and controlling heater operations at either a single pool or at a plurality of different locations such as sites 10, 11, 12 and 13 can also be utilized. Use of such a device is facilitated by the fact that the communications link 9 between the central computer, the pool controller itself and outside data sources such as weather data, can be provided via the internet or other known communications device.

The fundamental logic and operation of the present invention is illustrated in FIG. 6. The temperature of the water in the pool is shown as the vertical or Y-axis. Time is shown on the horizontal or X-axis. Point A is the water temperature (Tswim) defined by the pool operator at the next scheduled or swimmable opening, which will occur at time $A^1$. The time $B^1$ is where the controller shut the heaters off providing certain conditions are complied with. The measured temperature of the pool, Tm, at time $B^1$ is indicated at point B. The time $C^1$ indicates a scheduled pool opening time where conditions will not be swimmable in accordance with operator pre-selected limits. To turn the heaters off, the time and date point $A^1$ must be determined. The time and date point $A^1$ is determined by a logic decision such as illustrated in FIG. 7E. An example of this calculation is illustrated in FIG. 7E, the time of the next scheduled or swimmable opening $A^1$ is determined at the next time that simultaneously the pool is scheduled to be open and is below a pre-selected limit, the ambient temperature is above a pre-selected limit and no rain is present (FIG. 7E, columns J–S). From point A the water temperature Tc is calculated from the future towards the current time backwards in one hour increments, based upon the current weather forecast, to the current time. An example of this calculation is illustrated in FIG. 7A. Tc is represented as the dashed line on FIG. 6. Tc could also be a non-linear curve depending upon the particular pool and weather.

If more than two hours exist between the points $A^1$ and $B^1$ and if Tm>Tc at the present time ($B^1$ FIG. 6) the heaters are shut off. Tm>Tc means there is more time (such as from time $C^1$ to point $D^1$ in FIG. 6) to heat the pool to temperature A by time $A^1$ than needed. Every fifteen minutes Tm is measured and compared to Tc and if Tm>Tc the heaters remain off. If Tm is less than or equal Tc (such as point D in FIG. 6) the controller turned the heaters on. Tm=Tc means that the time to heat the pool to the predetermined temperature A by the time $A^1$ is mathematically identical to the time between points $D^1$ and $A^1$ in FIG. 6. Tm<Tc means that the heaters are mathematically behind in heating the pool to temperature A by the time $A^1$, based upon the forecast weather between the present time and the time $A^1$. Such occurrence is limited to fifteen minutes in this example. Once the controller turns the heaters on at time $D^1$ Tm data is recorded on the hour. In the alternative, the heaters can be on for a pre-determined period of time prior $D^1$. This can be accomplished by reducing Tm or increasing Tc a small fixed amount in order to avoid getting behind in the heating.

Figure 3:
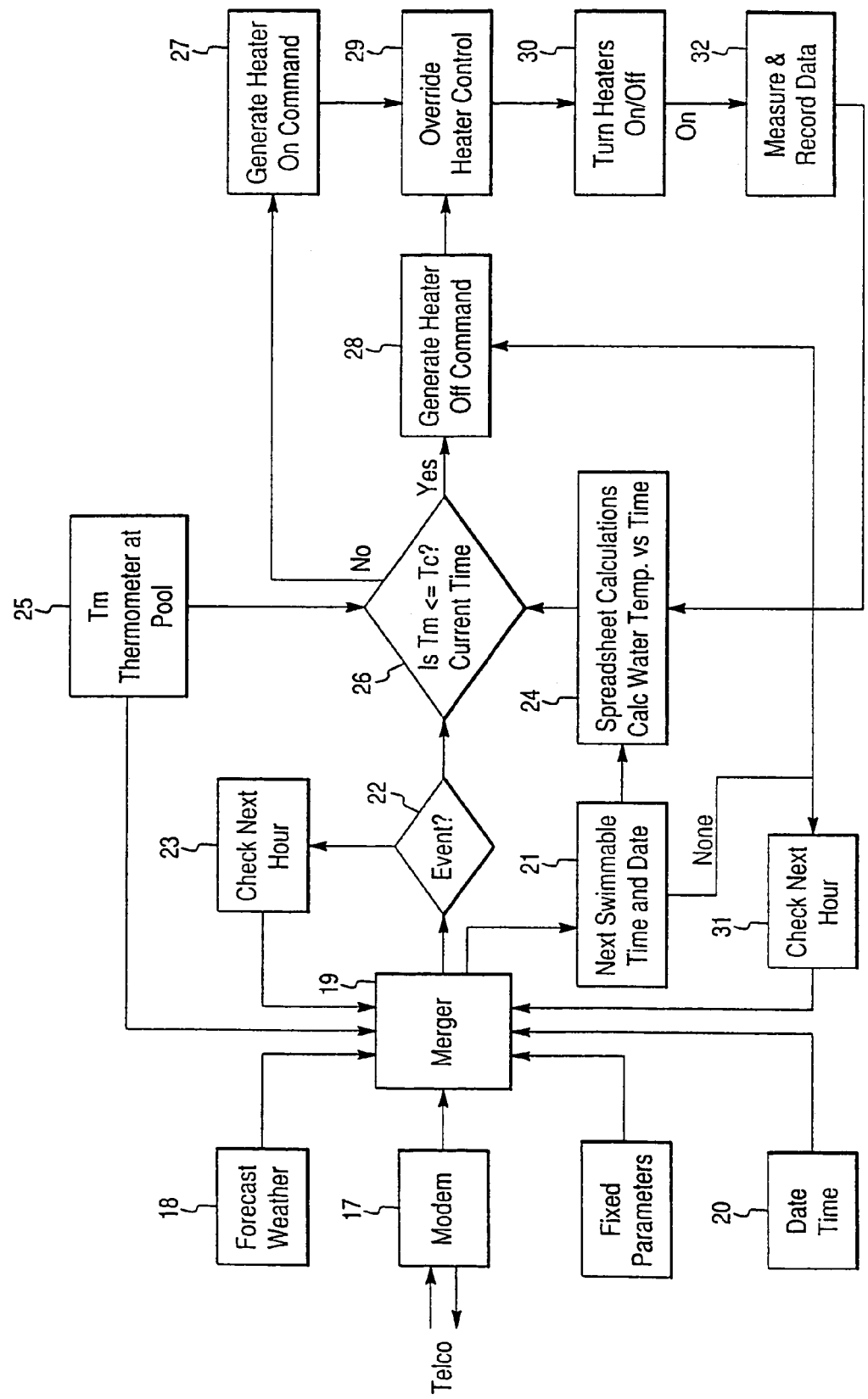
FIG. 3 is a general flow diagram of one embodiment of the system of the present invention.
Figure 4:
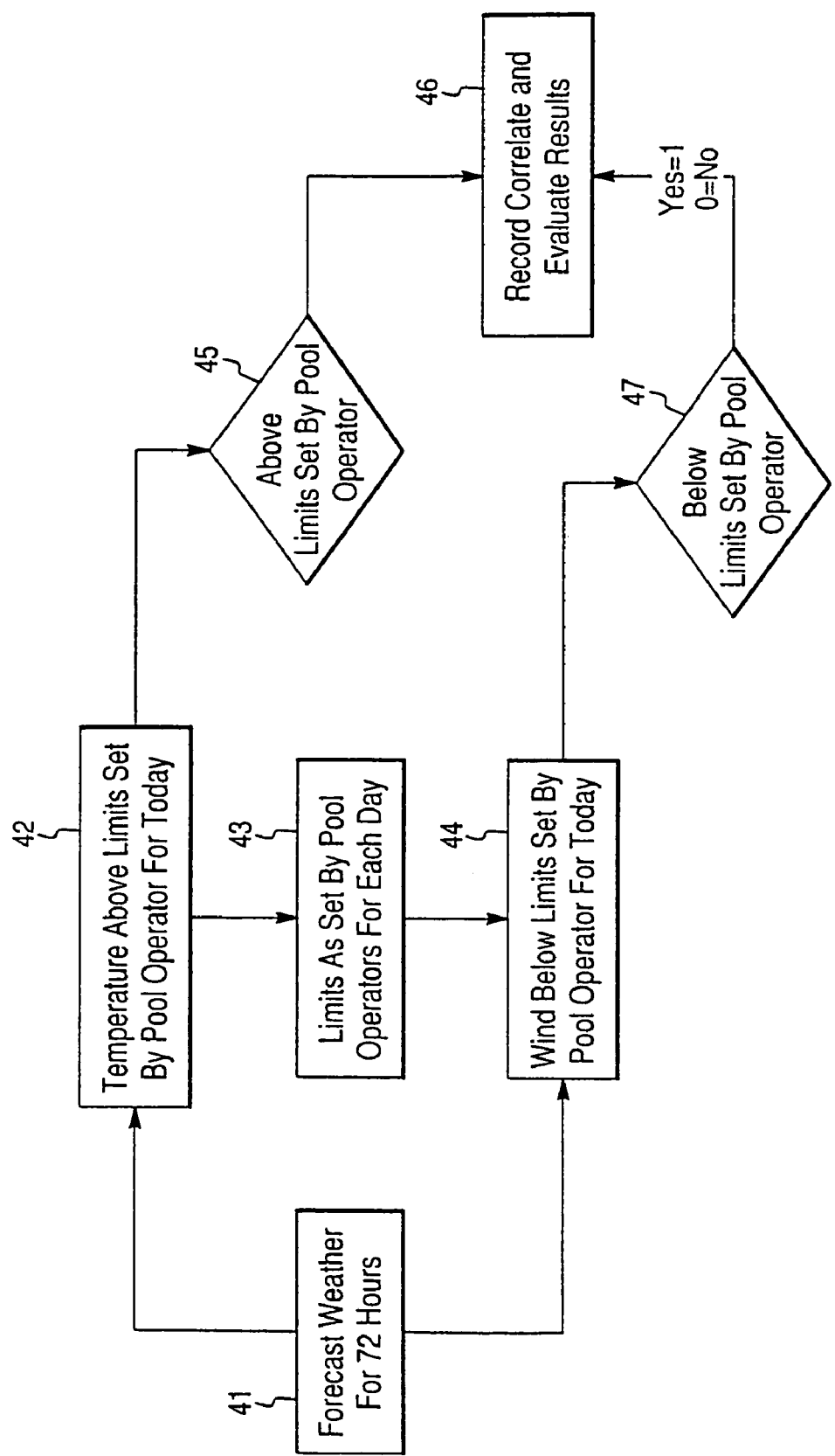
FIG. 4 is a general flow diagram of the steps that are utilized to determine whether an event is present in accordance with one embodiment of the present invention.

Referring now to FIGS. 3 and 4, the operation of one preferred embodiment of the system as illustrated generally in FIG. 1 and the controller generally designated as 2 will now be discussed in detail. The controller features a data merger 19 that stores, combines and organizes a variety of data. The data merger 19 constantly assembles variable information from a variety of sources and merges it with fixed parameters and operator preselected criteria to determine whether an event is present to activate the controller and disrupt the normal heating cycle of the pool. The merger 19 is in communication with a modem 17 or similar known communications link to enable it to receive from and also potentially transmit data to other sources outside the controller. The data merger 19 includes fixed parameters from block 16 such as the gallons of water in the pool, the pounds of water in the pool, the surface area of the pool, the number of heaters for the pool, the energy for each heater, efficiency of each heater etc. The fixed parameters 16 also include various definitions and constants utilized in the various calculations it makes such as the British thermal unit and the factors to convert cubic feet of water to gallons of water, gallons of water to pounds of water and BTU's to kilowatts. The merged data is available on a common bus to all controller functions.

The fixed parameters 16 further include a variety of criteria pre-selected by the pool operator, which will define both the time and weather conditions that the pool will be desired to be used. For example, the fixed parameters 16 include the hours of operation for the pool, the days that it operates and the desired water temperature for use and related thermostat settings. The fixed parameters 16 also include the criteria that the operator desires to be utilized to determine whether the weather will be deemed suitable for swimming during a time that the pool is scheduled to be open. These parameters can include the minimum ambient temperature to permit operation of the pool and the maximum wind speed to permit operation of the pool. Additional optional factors can be added in, such as, the degree of cloud cover, humidity, direction of the wind, wind chill effect or the chance or existence of precipitation as additional factors. These preselected factors are compared to the forecast weather, as will be described in detail to follow, in order to determine whether it will be too cold or windy at the time the pool is scheduled for use in the future to determine whether the normal heating cycle of the pool should be overridden and the heaters shut off.

The data merger 19 also receives and processes information regarding the forecast weather conditions in block 18 on either a continuous or periodic basis. The forecast weather could be entered manually or more preferably be provided on an automatic basis. In preferred systems, forecast weather data is collected through the internet or similar known communication devices. An example of such a known system that can provide such data is manufactured by Intellicast and provides an hourly forecast for the next forty-eight to seventy-two hours, which is updated as needed. Such forecast data tends to be more accurate since it is updated on a virtually constant basis as weather conditions change. The forecast weather that occurred during a event and correlated with the event time are also provided to the data merger 19 from block 18. These forecast weather conditions can include such things as the ambient temperature, humidity level, velocity of and wind velocity and direction.

The data merger 19 is also provided with date and time information from block 20. This date and time information is utilized to correlate all data in the merger including the fixed parameters 16 in the forecast weather 18. In preferred systems the date and time information provided in block 20 will automatically update from the internet or other known reliable source of time information. Once the controller 2 is activated, then the data merger 19 is also provided with water temperature data from the pool in block 25. This data is measured and recorded and correlated with a date and time from block 20 in the data merger 19. The pool water temperature data 25(Tm) is provided on demand with the on site pool thermometer 25.

As described above, the data merger 19 constantly assembles variable information and merges it with fixed parameters to determine whether an event is present to activate the controller and disrupt the normal heating cycle. The first stage of this logic process is illustrated in block 21 where it is determined whether an event that may require activation of the controllers to override the normal heating cycle. The logic followed in determining whether an event is present is illustrated in more detail in FIG. 4 and FIG. 7E.

The controller first examines the limits as previously set by the pool operator for each day of operation in block 43 of FIG. 4. These limits have been provided as fixed parameters 16 to the data merger 19 as illustrated in FIG. 3. Although the limits can include other parameters they typically include at least an ambient temperature below which it is deemed the pool will not be in a swimmable condition, a maximum wind speed above which a pool will likewise be determined to be un swimmable and a wind chill table that will have wind/temperature relative limits that will also be used to determine unswimmable conditions. These limits can be varied by the pool operator but function as preselected criteria for a given date and time. Specifying different limits for weekends and holidays or other reasons are also permitted by the system.

As previously stated, the data merger 19 is provided with the forecast weather for a time period in the future, preferably seventy-two hours. The forecast is updated either daily or hourly and as needed if a significant change occurs in the weather forecast that would change the pool operation. This forecast weather data is represented in block 41 of FIG. 4. Determining whether an event is present that might cause the heater control to be interrupted occurs in block 22. The way in which this is determined is illustrated in FIG. 4.

In the illustrated example, the forecast ambient temperature and wind speed for the pool location as illustrated in blocks 42 and 44 are compared to the pre-selected limits in blocks 43, 45 and 47 respectively. The event of the controller in block 22 of FIG. 3 can be programmed to compare the pre-selected limits to forecast temperature and wind conditions at the next time that the pool is scheduled to open over a three day period. Alternatively, the controller can be programmed to compare the pre-selected limits against the average forecast wind and temperature conditions for any period into the future that forecast data available for or against only the operating hours in each of those periods. In block 45, the controller compares the forecast temperature to the minimum pool temperature preselected by the operator to permit swimming for the days in question and determines whether forecast temperature is above or below those limits. The results of this comparison for the entire time period that forecast weather data is available are recorded in block 46.

The controller does a similar comparison in block 47 to determine whether the forecast wind speed for the time period that forecast data is provided will be below the maximum preselected by the pool operator to permit swimming at any of the scheduled openings of the pool within the time period that forecast data is available. This result will likewise be recorded in block 46 and correlated with the results regarding temperature from block 47. As part of the correlation in block 46, the controller deems that forecast weather conditions will be swimmable only when the forecast weather for opening times within the time period that forecast data is available will be both above the minimum temperature set by the pool operator and below the maximum wind speed set by the pool operator to permit operation. A simple example of the foregoing would be a situation where the pool operators have determined that the pool will not be used unless the ambient temperature is over seventy-two degrees and the wind speed is less than ten miles per hour. If for example, the temperature at a scheduled opening of the pool during the time period that forecast data is available will be sixty-five degrees and/or the wind speed will be twenty miles per hour, then the controller would determine that the pool does not need to be heated at the time of the next scheduled opening corresponding to those conditions.

The controller next proceeds to make an evaluation as to whether the normal heating cycle of the pool heaters should be interrupted. The last thing the controller does in block 46 is evaluate the correlated and recorded results from 45 and 47. If the temperature is above the limits set by the pool operator and the wind speed is below the limit set by the pool operator for each of the scheduled opening times within the period that the controller has forecast weather data for, it determines that no event is present that requires activation of the controller, the controller then takes no action and returns to its monitoring mode and checks again in an hour in block 23 for any new events in block 22 of FIG. 3. Once the controller has received updated forecast information it repeats the steps illustrated in FIG. 4.

If on the other hand it is determined that the temperature and/or wind conditions forecast for any scheduled opening within the time period that forecast data is available, fall outside of the preselected limits to permit swimming, then the controller will make the determination that an event is present. The controller then proceeds along the path of making a determination as to whether to interrupt the normal heating cycle of the pool as will be described. The event 22 can also optionally be programmed so that it operates to activate the controller only during times either outside of the normal pool operating hours and/or only when the current weather conditions at the pool are swimable.

A thermometer 25 located at the pool site is utilized to obtain continually updated data regarding the current temperature of the pool water Tm as illustrated in FIG. 3. When the controller 2 determines that an event is present in block 22, this means that the forecast weather indicates that it will be too cold and/or windy or rainy to operate the pool at a scheduled opening time over the period of time that forecast data is available, which in the described example is seventy two hours arranged as three twenty-four hour periods.

The controller must next determine whether conditions at some future date within the time period that it has forecast data will meet the required criteria for swimming as indicated in 21. If the forecast indicates that swimable conditions will not be present over the entire time period of the forecast data, after a short cycle test, a message will be generated by the controller to override the heating cycle in block 28. At the same time, the controller will send a message in block 31 to the merger block 19 to check new forecast data as it is received until it finds the next scheduled opening time that is swimable in block 21.

If on the other hand, an event is present and there is a scheduled opening time later within the period for which forecast data is available that indicates that conditions will meet the pre-selected criteria for swimming, the controller then proceeds to find the time where the Tm is less than or equal to Tc to turn the heaters back 29 on. In order to do this, the controller must first calculate Tc as illustrated in FIG. 7A. The Tc curve represents the time required to heat the pool to the temperature pre-selected by the pool operator by that next scheduled swimable opening before shutting the heaters off, taking into account the forecast weather conditions for the intervening time period from block 18 in FIG. 3. In order to prevent an on/off short cycle from developing there must be a least a two hours between turning the heaters off (the current time $B^1$ in FIG. 6) and the time the pool is to be heated and ready for use (next scheduled swimable opening $A^1$ in FIG. 6). Short cycling is also prevented by keeping the heaters on once turned on until the next scheduled opening. Before the heaters are shut off Tm must also be confirmed to be greater than Tc.

When it is desired to have the pool ready for swimming the controller has the capability to determine when the heaters must be turned on (when Tm is less than or equal to Tc) in order to have the swimming pool water temperature at the pre-selected temperature at the required next swimable opening time. The procedure that is used to calculate how long to heat the pool once the controller has interrupted the heater control for the given forecast conditions is very dynamic. When the system is first brought on line (start-up) and the amount of measured data is minimal, the system relies on a few measurements and uses mathematical models and algorithms to calculate the number of hours needed to heat the pool to the desired temperature A by the next swimable opening time $A^1$ in FIG. 6. As the operation of the controller continues and matures and more measurements are made the procedure relies more on actual measured performance data from the pool. If the heating of the pool water exactly matched the calculated performance, Tm would follow the same curve as Tc in FIG. 6 between the time $D^1$ and $A^1$.

Referring to FIG. 6, at time $C^1$, the measured water temperature Tm is greater than the calculated water temperature Tc and therefore the heaters are kept off by the controller. At time $D^1$ the heaters are turned on because the measured water temperature Tm is less than or equal to the calculated water temperature (Tc). The water temperature is preferably measured every fifteen minutes and the comparison between Tm and Tc is also made every fifteen minutes. When the measured water temperature (Tm) at the same point in time is equal to or less than the calculated water temperature Tc (point $D^1$ FIG. 6) the water heaters are turned on.

The technical details of the process followed by the system and the controller are described below. Once the controller is activated and the heaters have been turned off, it will thereafter monitor for future events as the forecast or actual weather conditions and the pool conditions change over time. Changes in these parameters may result in a change in the Tc curve and/or the point in time where Tm is equal to or less than Tc. For example, if due to any such change, there is now more time than necessary to heat the water from the present time to the next scheduled pool opening when the weather conditions will permit swimming than is required to bring the pool temperature to the required level (where the conditions did not previously exist) then the controller generates a command to override the existing heating system in block 29 and sends a signal the pool heater control to turn the heaters off in block 30 as previously described. Once this is done, the controller is activated maintaining the heaters in the off position until Tm is less than or equal to Tc based upon the current Tm and forecast data.

The controller will update its calculation of the time required to heat the pool every time it receives updated forecast data. The system continues to update the Tm every quarter hour. As a result, the controller achieves three objectives. First, the pool water temperature will usually change over time. Second if the forecast conditions change, changing the calculated temperature Tc curve to before the next required opening time, then the updated calculation will result in compensating for this and turning the heaters on at the revised time. Third in an extreme condition, the weather forecast may change dramatically enough so that what had previously been forecast as swimable conditions at a scheduled opening of the pool in the future have now changed. In this instance the system will reset $A^1$ in FIG. 6 to a scheduled opening further in the future and recalculate the Tc curve in block 24 based upon that value in accordance with the procedure illustrated in FIG. 7A. In the alternative, the weather forecast could in the period become more favorable than that in the original calculation made in block 24 and FIG. 7A and require less time to bring the pool water temperature to the required level at the next scheduled opening time that is swimmable. In this situation the controller will operate to save additional energy by recalculating the Tc curve and turn the heaters on for a shorter time period prior to the next scheduled opening.

Referring to FIG. 3, each time the measurement of Tm is updated in block 25, the controller also takes this into account in its continuous queries in block 26 as to whether the time required is greater than the actual time between the present time and the next scheduled opening of the pool (Tm>Tc) when conditions will be swimmable as determined in block 21. If Tm is greater than Tc at the present time, then the controller takes no action and waits until a time when Tm equals or is less than Tc. In the intervening time any new data is calculated and updated in block 24 that may impact this determination. Whether any updates occur in 24 or not, the controller continues to compare Tm against Tc. If Tm is determined to be equal to or less Tc in block 26 at the present time, then the controller sends a command in block 28 to the heater control 29 to turn the heaters in block 30 on. Every time the controllers turn the heaters on in block 30, the actual performance of the heating of the pool water (Tm between time $D^1$ and $A^1$ in FIG. 6) is measured and recorded in block 32 and entered into spreadsheet calculations in block 24 for use when the same conditions are encountered in the future. The heaters will then remain on until the next scheduled opening time that is swimmable. At that opening the controller returns to its non-activated monitoring mode looking for future events that may cause it to interrupt the heater control. At that point the heaters will return to receiving commands solely from the heater control.

It will be understood by one of skill in the art that the methodology described above can also be used to determine whether the pool heaters can successfully be shut down during periods of non use, such as night or days or when the pool is either not open or may have limited hours of operation. The same principles would apply to shut down the heaters and still have the pool ready for the next scheduled opening time and save energy.

Measured data based on actual experience in heating the pool water is the preferred way to manage the operation of the controller. During the initial start-up phase equations using various independent variables calculate the performance of the pool for that time period when the same conditions are encountered. Based on these calculations and the forecast weather the pool is cycled by the controller through cooling and heating cycles. The equation based cycles are used to collect measured data. If the measured to actual performance data is different than the initial calculated data for Tc then the equations will take that data into account for future calculations. The measured data is used to improve the independent variable wind velocity over the water and the measured data is used to determine the Tc curve in the future when the same conditions are encountered. The equations utilized are described below. The forecast wind is not an accurate representation of the wind velocity over the water so therefore the apparent wind velocity over the water is calculated using measured data. Calculated start-up data predicting pool performance is replaced by measured data reflecting actual pool performance as it becomes available.

The following symbols and abbreviations are used in the calculations set forth below:

ΔT is the temperature difference determined by subtracting the temperature of the swimming pool water from the ambient air temperature unless otherwise noted.
Btu's are British thermal units.
$F^2$ is the symbol for square feet.
$F^3$ is the symbol for cubic feet
(Number') means the number is in feet.
hr is the symbol for hours.
° F. is the symbol for degrees Fahrenheit.
Lbs is the abbreviation for pounds
$H_2O$ is the abbreviation for water
° R is degrees Rankin or (° F.+460°)
Vwf is the wind velocity in mph as forecasted
Vwc is the wind velocity in mph as calculated
A is the pool area in $F^2$

| | |
|---|---|
| Qcon | Conduction losses Btu's/hr |
| Qr | Radiation losses Btu's/hr |
| Qc | Convection losses Btu's/hr |
| Qe | Evaporation losses Btu's/hr |
| Qs | Solar Energy Btu's/hr |
| Tc | Temperature calculated |

A model pool is used to demonstrate the processes and equations of the present invention. The model pool has an overall conductive loss (through walls or bottom) of U=0.1 Btu's/$F^2$/ΔT/hr or less except where specified differently. U is the overall conductive heat transfer coefficient in Btu's/$F^2$/ΔT//hr. A U=0.1 is considered to be good engineering for conservation purposes and is obtainable in practical designs.

Conductive losses should be U=0.1 or less. U=0.1 are very small losses and do not effect the pool calculations enough to be considered.

Model pool:

| Length | L | 60' |
|---|---|---|
| Width | W | 40' |
| Av. Depth | D | 5.5' |

Surface Area=(60')*(40')=2400 $F^2$

Cubic feed of water=(60')*(40')*(5.5')=13,200 $F^3$

To convert from cubic feed of water ($F^3$) to gallons (g) multiply $F^3$ by 7.48 g/$F^3$ Gallons=(13,200 $F^3$)*(7.48 g/$F^3$)=98,736 g To convert from gallons (g) to pounds (lbs) of water multiply gallons of water by 8.34 lbs/g. Pounds of water=(98736 g)*(8.34)lbs/g=823,455 lbs Sizing the heater for the model pool can be accomplished using well known publicly available information such as a RayTherm Commercial Pool Sizing Chart. The first heater selected is a natural gas heater, the RayTherm 1083 with 888,060 of output Btu's for a pool area of 2400 $F^2$ and $\Delta T=30°$ F.

The known data for this heater also indicates:

| For faster heat double Btu's/hr: | 1,760,120 Btu's/hr |
|---|---|
| Than select next larger: | 2,049,180 BTUs/hr |
| High wind note increases it by one model size | 2,460,000 BTUs/hr |

Finally the RayThem 3001 with 3,000,000 input Btu's/hr and output Btu's/hr of 2,460,000 according to the data sheet.

British Thermal Units

By definition the amount of energy to raise one pound of water one degree Fahrenheit is one Btu. By extension a pound of water that has lost one degree Fahrenheit has lost a Btu of energy. Btu's are converted to water temperature change using this relationship. Water temperature changes are converted to Btu's with this relationship.

Polarity Gains/Losses

If a energy loss calculation is negative it indicates a energy gain.

Conductive Losses

For below grade swimming pools surrounded by earth very little energy is lost through the walls or bottom. For above grade swimming pools with sufficient insulation such as one inch of fiberglass the conductive losses are also very small. In this invention conductive losses are not considered separately. Any conductive losses are reflected indirectly in the measurement of the pool water temperature Tm vs. independent variables Reference The document with title "Energy Smart Pools, Version 2.0 for Windows was prepared by U.S. Department of Energy, Denver Regional Support Office" is referred to as the "DOE Document" in this invention. The DOE Document is the reference for equations 1, 2 and 3. The equations are referred to as DOE Document in the balance of this description.

Radiation Losses

Calculating Radiation Energy Loss Radiation losses from warm water to a cool sky are to be calculated.

$$Qr=(0.173)(Ap)(0.9) [(0.01*(Tp+460))^4-(0.01*(Tsky+460))^4] \text{ Btu's/hr.} \quad (eq.1)$$

Qr is radiation losses (or gains) in Btu's/hr

Ap is the amount of the pool surface exposed to the sky in $F^2$

Tp is the average temperature of the pool water ° F. for the $n^{th}$ hour.

Tsky is the average temperature of the sky ° F. for the $n^{th}$ hour

Tdp is the average dew point temperature of the air ° F. for the $n^{th}$ hour $$Tsky=[(Tdb-32)/1.8]*[-0.292+Tdp/450]^{0.25} \quad (eq.1a)$$

Equation 1a is eq.6 from "Measurements and Analysis of Evaporation in a Inactive Outdoor Swimming Pool" converted to terms used in the present invention and from degrees centigrade to degrees Fahrenheit.

Calculating Convection Losses

Convection losses occur from the warm water to the cool air.

$$Qc=(H)(Ap)(Tp-Tdb) \quad (eq.2)$$

Qc is the convective heat loss (or gain) in Btu's/hr

H is the convective heat loss in Btu's/$F^2$/° F./hr and H=(1+0.3 Vw)

Vw is the wind velocity in mph

Ap is the pool area in $F^2$

Tdb is the Dry Bulb air temperature

Tp is the pool water temperature

Evaporation Losses Calculation

This equation was adapted to invention terms from the Evaporation Rates-Quiet Pool information found in the DOE Document. In this invention the pool water temperature is used for surface water temperature by definition. PSI is calculated by the "PsyFunc" program and PSI is converted to in.Hg by multiplying by 2.036 to convert PSI to in.Hg $$Qe=(Ap)(C1+C2V)(2.036)(Pw-Pdp) \text{ Btu's/hr} \quad (eq. 3)$$

Qe is the evaporation heat loss(or gain) in Btu's/hr

Ap is the area in square feet $F^2$

C1 is 69.4 Btu's/hr/$F^2$/in.Hg

C2 is 30.8 Btu's/hr/$F^2$/in.Hg

V is wind speed in mph.

Pw is the saturation vapor pressure present at the water surface, PSI

Pdp is the saturation vapor pressure at the ambient air dewpoint, PSI

PSI are converted to in.Hg by multiplying PSI by 2.036

Converting to Vapor Pressure

In the spreadsheet a program that calculates vapor pressures was purchased from Linric Company. The program is called "PsyFunc" and it works as an add-in to an Excel® spreadsheet. For instance enter Ta and RH and the program will output Grains, Tdp, and Pdp. For Pw enter 100% RH and temperature of the water into the program. The program as used calculates PSI for vapor pressures and the as the equations use in.Hg. PSI is multiplied by 2.036 to convert PSI to in.Hg.

Solar Energy Input

Swimming pools are efficient users of solar energy. Depending on a multitude of factors the solar input energy can be significant. The present invention measures the effect of the solar energy every hour by measuring the pool water temperature (Tm). The measurement of the swimming pool water (during an event) every hour measures all the independent variables that determine the gain or loss of energy in the swimming pool, including solar energy input.

It is known that the actual instantaneous value of solar radiation depends on the altitude, latitude, time of year, time of day, sky condition, and orientation angle of the receiving body. One of the options of the present invention is to install the controller at the factory when the heaters are manufactured and connect it to a phone line during installation at the pool. In order to include solar energy calculations, a site a survey is necessary to determine the amount of pool surface exposed to the sun on a seasonal basis and to introduce other factors.

One option is enter "0" for all the required solar inputs in FIG. 7D [columns C9 to C20]. In this case the system is fail-safe in start up. By doing this, the equations assume that there is no solar energy input and that it will take a longer time to heat the pool by the calculations of the equations. The result of this is that the pool is ready sooner than needed since there actually is some solar energy input that will reduce the necessary heating time. In any case with a mature system managed by measured data all independent variables (including solar) are included in the measurements.

Another option for taking solar input into account is now demonstrated. The solar energy input can be derived from a known publicly available source such as a manual entitled Solar Radiation Data Manual for Flatplate Concentrating Collectors available from The National Renewable Energy Laboratory. The nearest physical location to the pool that data is available for can be found in the manual and the average monthly data for zero degree tilt is used. Spreadsheet calculations for this input are shown in FIG. 7D. The total solar input for the day is divided evenly between the daylight hours and corrected in a fail-safe manor with daily forecast weather data.

With reference to the columns of FIG. 7D:
[A9 to A20] Month of year
[B9 to B20] Enter the average kWh/m² from NREL manual in column "B" for each month.
[C9 to C20] are Btu's/F²/day=(317.2)*(kWh/m²/day)
[D9 to D20] and [E9 to E20] Enter Sunrise and Sunset for each month in columns D and E respectively. Use a 24 hour clock and round each time off to nearest hour.
[F9 to F20] Hours of daylight=(Sunset)−(Sunrise)
[G9 to G20] Btu's/F²/hr=(Btu's/F²/day)/(Hours of sun light)
[H9 to H20] Enter the area of the pool in square feet as Ap column H.
[I9 to I20] Enter a shade factor for each month in column I. The shade factor is the percentage of the pool exposed to the sun each month divided by 100.
[J9 to J20] Enter Screen room factor. Use 0.66 for screen room factor if a screen room is present and the exact number is unknown.
[K9 to K20] Is the daily rain factor for the hours of sunlight it is "0 than [K9 to K20] is a numeric 1. Otherwise a numeric 0.
[L9 to L20] is the clear sky factor from 7–5 [U33]. [U33] is the average of the clear sky factors for the daylight hours or 0.88 in this example.

$$[M9 \text{ to } M20] \text{ is } Qs=\{(Btu\text{'s}/F^2/hr)*[H]*[I]*[J]*[K]*[L]\} \text{ Btu's/hr} \qquad eq.4$$

$$[N9 \text{ to } N20] \text{ is } \Delta Ts=[(Btu\text{'s}/hr)/(lbs \text{ of } H_2O)] \text{ °F.} \qquad eq.4a$$

The delta temperature change due to solar radiation ($\Delta Ts$) or ($\Delta Qs$) for calculations is obtained from FIG. 7D Solar Radiation Energy for the correct month [U9 to U20] for rain and "1" otherwise. The factor is derived in FIG. 7E and if [M31] is true a logic "1" as shown Calculating Wind Velocity Over the Water (Vwa)

The present invention calculates the apparent wind velocity over the water (Vwa) based on measured data. Except for the wind velocity, the independent variables are suitable for use to calculate the pool reaction to various weather scenarios. All the independent variables depend on the forecast weather but the wind velocity is modified by calculations. The measured change in pool temperature (T2−T1) is used with the equations to calculate the apparent wind velocity over the pool. The essential procedure is to use all independent variables and known factors as stated and from these given values calculate the apparent wind velocity over the pool water.

Because the wind velocity is highly dependent on the direction the wind is coming from the data is divided into eight sectors of plus and minus 22 degrees as listed in FIG. 7C.

The wind velocity used in the spreadsheet calculations (Vwc) to determine how long to heat the pool are the average of five (Vwa) measurement/calculations.

The first step in calculating Vwa is to determine the total change in energy in the pool for nth hour based on measured and known data.

$$\Delta \text{ Energy Change}=\Delta E1=(T2-T1)(lbs \text{ of } H_2O) \text{ Btu's/hr} \qquad eq.5$$

T2 is the temperature at the end of the measurement.
T1 is the temperature at the beginning of the measurement.
The term (lbs of H₂O) is the pounds of water in the pool.
In the spreadsheets (Qx) that are Btu's/hr are often divided by pounds of water in the pool to put the data in terms of temperature $\Delta Tx$.

$\Delta E2$ is also equal to the sum of Qh plus Qs less the losses of Qr, Qc and Qe.

$$E2=(Qh+Qs-Qr-Qc-Qe) \text{ Btu's/hr} \qquad eq.6$$

$\Delta E1=\Delta E2$ in this invention by definition.

$$\text{Than: } (T2-T1)(lbs \text{ of } H_2O) \text{ Btu's/hr}=(Qh+Qs-Qr-Qc-Qe) \text{ Btu's/hr} \qquad eq.7$$

The energy change, all the variables and constants are known to acceptable limits except wind velocity over the water (Vwa). The variables and constants are plugged into both sides of equation 7 and the equation is solved for Vwa for the nth hour.

$$Qe=(Ap)(C1+C2Vwa)(2.036)(Pw-Pdp) \text{ Btu's/hr} \qquad eq.3$$

$$\text{Let: } \Delta Qe=K1+K2: \qquad eq.3a$$

$$C1=69.4$$

$$C2=30.8$$

$$K1=Ap(C1)2.036(Pw-Pdp)=141.3(Ap)(Pw-Pdp) \qquad eq.3b$$

$$K2=Ap(C2Vwa)(2.036)(Pw-Pdp) \qquad eq.3c$$

$$K2=62.7(Ap)(Vwa)(Pw-Pdp) \qquad eq.3c$$

$$K3=62.7(Ap)(Pw-Pdp) \qquad eq.3d$$

$$K2=(Vwa)K3 \qquad eq.3e$$

$$Qc = (1+0.3 Vwa)(Ap)(Tp-Tdb) \qquad \text{eq. 2}$$

$$\text{Let: } Qc = L1 + L2 \qquad \text{eq. 2a}$$

$$L1 = Ap(Tp-Tdb) \qquad \text{eq. 2b}$$

$$L2 = (0.3)(Vwa)(Ap)(Tp-Tdb) \qquad \text{eq. 2c}$$

$$L3 = (0.3)(Ap)(Tp-Tdb) \qquad \text{eq. 2d}$$

$$L2 = (Vwa)L3$$

$$\Delta En2 = (Qh+Qs-Qr-K1-K2-L1-L2) \qquad \text{eq. 8}$$

$$\Delta En1 = \Delta En2 \qquad \text{eq. 8a}$$

$$\Delta En1 = (Qh+Qs-Qr-K1-(Vwa)K3-L1-(Vwa)L3) \qquad \text{eq. 8b}$$

$$(L3+L3)Vwa = (-)[\Delta En1-Qh-Qs+Qr+K1+L1] \qquad \text{eq. 8c}$$

$$Vwa = \{(-)[\Delta En1-Qh-Qs+Qr+K1+L1]/[L3+K3]\} \text{ mph} \qquad \text{eq. 8d}$$

By forcing a measured value to be equal to a calculated value in equation 8a, the possibility of a negative wind is mathematically created. Vwa picks up any errors in the input constants such as Btu's/hr input, pounds of water in the pool or other isues. A negative wind indicates that the wind at least mathematically is putting energy back into the swimming pool. The wind is named the apparent wind (Vwa) and a mathematically negative wind is acceptable as Vwa is now a correction factor. The term apparent wind is now a correction factor to make a calculated value based on equations agree with a measured value.

All the identified energy losses and gains are calculated and subtracted from (or added to) the total measured energy En. The modified energy number is divided by the multipliers on Vwa. The data calculated is entered in the matrix shown as FIG. 7D as the velocity of the wind apparent Vwa vs. Vwf.

Spreadsheet Calculations

Calculate Tc

The purpose of the calculations in FIG. 7A is to determine the projected pool water temperature (Tc) at the nth hour at some future date based upon forecast data. The desired time, date and temperature of the pool at the next swimmable scheduled opening is required for the first entry. For the example shown the time is 9:00 AM on Jan. 16, 2010 and the desired temperature is 82 degrees ([L], [37] in this example). The temperature at Tc is the temperature at $Tc_{(n+1)}$ with energy gains (expressed as temperature changes) subtracted and energy losses added (a calculated T2−T1). Tc is calculated backwards from the future date towards the present date. The Tc as used in FIG. 7A can be recalled from previous measurements T2−T1 from the X-Y Matrix in FIG. 7F if available. The recalled (T2−T1) is used if a measured data cell can be located for existing conditions. If no measured (T2−T1) cell is located the Tc is calculated and as demonstrated in FIG. 7A. The X-Y Matrixes (32 of them with a sample shown a FIG. 7F) are identified by time of day, wind direction, vapor pressure differential and wind velocity. If no cell is located for these same independent variables Tc is based on calculations.

Column and row labels are furnished and used. [A] is read as column A. [A] is the sheet number. Read [18] as row 18. [A7] is read as column A row 7. The spreadsheets illustrated in FIGS. 7A and 7B presented give a cross section of operations. Until indicated otherwise time is frozen at 10:01 AM on Jan. 15, 2010. FIG. 7A will be covered with this time as the reference. At some point prior to 10:00 AM on Jan. 15, 2010 the decision was made to shut the heaters off based on criteria and forecast issues discussed previously.

[A] is the number of this spreadsheet and covers 24 hours.

[B1] to [B8] are labels for [C1] to [C8] that are information required for spreadsheet calculations.

[B1] is spreadsheet date at Jan. 15, 2010.

[B2] is pool area in $F^2$ as listed in [C2]

[C1] is spreadsheet time at 10:01 AM (Time is frozen at 10:01 for this discussion)

[B4] is pounds of water in the pool as shown in C[4]

[B5] Qh is the heater input in Btu's/hr as listed in [C][5]

[B7] is Qh/lbs of water=$(\Delta Th)$ ° F. In this example it is 2.99 as shown in [C7].

[B8] is the label for the altitude of the pool and the altitude in feet is inserted into [C8].

[B14 to B37] are the date

[C14 to C28] is the time

[D] Vw is the forecast wind velocity in mph

[E] is forecast wind direction in degrees magnetic

[F] Ta is the forecast temperature in degrees ° F. also called Tdb or dry bulb temperature in some weather forecasts.

[G] RHa is the forecast Relative Humidity of the ambient air

[H] Gr is grains of water a term needed to calculate Tdp

[I] Tdp is the forecast dew point temperature in ° F.

[J] Pdp is saturation vapor pressure for ambient air in PSI

[K] Is the measured pool water temperature

[L] Tc is the Temperature calculated at the nth hour.

$$Tc = Tc_{(n+1)} - \Delta Th - \Delta Ts + \Delta Te + \Delta Tc + \Delta Tr$$

[M] is the Pw or saturation vapor pressure of the water in PSI.

[N] is (Pw−Pdp) in PSI

[O] is the sky temperature Tsky in ° F. (Equation 1a)

[P] and [Q] are terms used in the equations to calculate $\Delta Tr$.

[R] is Qe (Equation 3) divided by lbs of water in the pool for $\Delta Te$ in ° F.

[S] is Qc (Equation 2) divided by lbs of water in the pool for $\Delta Tc$ in ° F.

[T] is Qr (Equation 1) divided by lbs of water in the pool for $\Delta Tr$ in ° F.

[U] is Qs (From 7–4 Solar Radiation Energy) divided by lbs of water in the pool for $\Delta Ts$ in ° F.

[V] is Vwc the wind velocity in mph (imported from FIG. 7-3)

Calculate Vwa (FIG. 7B)

Only those terms or equations that are not the same as FIG. 7A are described below. The time reference for this sheet is Jan. 16, 2010 at 9:01 AM or the events on this page are in the past. The purpose for this sheet is to calculate Vwa after measured (T2−T1) data is available.

[L] Tc is the Temperature calculated and imported from FIG. 7A as a reference.

[O] is Qr (Equation 1), Btu's/hr imported from 7A as $\Delta Tr$ and multiplied by pounds of water.

[P] is Qs (From FIG. 7D Solar Radiation Energy), Btu's/hr imported from 7–1 as $\Delta Ts$ and multiplied by pounds of water.

[Q] is $\Delta En1$ (Equation 5)

[R] is K1 (Equation 3b).

[S] is L1 (Equation 2b)

[T] is K3 (Equation 3d)

[U] is L3 (Equation 2d)

[V] is VwA (Equation 8d) the wind velocity in mph that is caculated on this sheet.

The calculated Vwa is inserted into FIG. 7D in one of the eight spreadsheets used to track Vwa per wind direction sector and calculate Vwc as a function of wind direction. Vwc is the average of five Vwa calculations. Do not use the first Vwa calculated when the heaters are turned on and stop calculating Vwa when Tm reaches Tswim (Tm> or equal to Tswim). Vwa is not calculated or at least not recorded in the spreadsheet in FIG. 7C unless the heaters are on.

Compare Tm to Tc: During an event when the heaters are shut down by the controller, the measured water temperature Tm in column K of FIG. 7B is compared to the calculated water temperature Tc in column L for the nth hour. As long as Tm is greater than Tc the heaters are maintained off. When Tm is less than or equal to Tc the heaters are turned on. This occurs in [K24] in the example illustrated in FIG. 7B.

Vw Matrix with Start-up Values (FIG. 7C)

Each 45 degrees of wind direction has a Vw Matrix in this example.

The installer on site determines a minimum wind [B3] and a wind factor [B4] that are inputted to the system. The minimum wind and wind factor are used to make an equation of the form (y=a+bx), where the minimum wind is "a" and "b" is the wind factor. y is the data and x is Vwf. The straight line (y=a+bx) equation is used to fill in the matrix in the spreadsheet in FIG. 7C at start-up. The matrix is overwritten as Vwa calculations become available as the controller operates over time.

The matrix operates on a first in first out basis. That is when a new Vwa is calculated [C] moves to [D], [D] moves to [E] etc. The prior [E] value is eliminated. For every input the data is recalculated and [H] is the sum with [I] being the average of the five Vwa inputs. Vwc[I] is the number use in FIG. 7A to calculate the Tc. Matrixes are addressed by wind direction sector as shown in FIG. 7H.

Solar Energy Input (FIG. 7D)

The solar energy input is derived from a manual called Solar Radiation Data Manual for Flat plate Concentrating Collectors available from The National Renewable Energy Laboratory. The nearest site location to the pool determined in the manual and the average monthly data for zero degree tilt is used. Spreadsheet calculations for solar energy input are shown in FIG. 7D.

With Reference to FIG. 7D:
Enter the kWh/m$^2$ in column "B" for each month.
Btu's/F$^2$/day=(317.2)*(kWh/m$^2$/day)
Enter Sunrise and Sunset for each month in columns D and E respectively. Use a 24 hour clock and round each time off to nearest hour.
Hours of daylight=(Sunset)−(Sunrise)
Btu's/F$^2$/hr=(Btu's/F$^2$/day)/(Hours of sun light)
Enter the area of the pool in square feet as Ap column H.
Enter a shade factor for each month in column I. The shade factor is the percentage of the pool exposed to the sun each month divided by 100.

$$Qs=\text{Btu's/hr}=(\text{Btu's/F}^2/\text{hr})*(Ap)*(\text{Shade Factor}) \quad \text{eq.9}$$

$$\Delta Ts=(\text{Btu's/hr})/(\text{lbs of H}_{2O})\cdot_{F.} \quad \text{eq.9a}$$

The delta temperature change due to solar radiation ($\Delta$Ts) or ($\Delta$Qs) for other uses is obtained from FIG. 7D.

Forecast Weather and Hourly Logic (FIG. 7E)

The forecast weather is entered as seventy two one hour increments and then updated at least once every twenty four hours or more often. The forecast weather is stored in spreadsheets as shown in FIG. 7E. FIG. 7E illustrate twenty four hours of one hour increments and it is one of three spreadsheets required. If the average weather forecast changes more than preset limits the site is updated immediately with the revised information. The forecasted weather is stored on these sheets in the appropriate row and column. Determinations are also made as to the pool being open or closed at given times depending on pool operator choices.

FIG. 7E:
 [A2] is the date of the forecast information on this sheet for the time at [C8]hours 1 to 24.
 [A] is the number of the hour and 1 thru 24 are shown. The number is used in some calculations.
 [B] thru [C] rows [1] thru [3] are sunrise and sunset information not used on this sheet but inputted to this sheet as part of the weather forecast download. Sunrise/sunset is used in FIG. 7-4.
 [F1] and [G1] is the opening time in 24 hour clock.
 [F2] and [G2] is the closing time in 24 hour clock.
 [F3] and [G3] is the number of hour open.
 [B8] to [B31] is the sheet number.
 [C8] to [C31] time in 24 hour clock.
 [D8] to [D31] is the scheduled opening and closed times of the pool. If the pool was operated 24 hours a day all entries would be "Yes".
 [E8] to [E31] is the forecast wind Vwf for this date/hour.
 [F8] to [F31] is the direction of the forecast wind.
 [G8] to [G31] is the forecast ambient temperature for this date/hour. This number is also used for the dry bulb temperature.
 [H8] to [H31] is the forecast relative humidity for this date/hour.
 [I8] to [I31] is the forecast dew point temperature Tdp for this date/hour.

In the example presented as part of FIGS. 7A and 7B the dew point is calculated. The calculation is not required when the forecast dew point is available.
 [J8] to [J31] is the forecast percentage rain for each date/hour.
 [K], [L] and [M] is the data to be averaged to determine the status of the pool.

Averaged data is normally used over the operating hours (or other hours as selected) to determine if the pool meets criteria for heating. The numbers for [K],[L] and
 [M] are from [E],[G] and [J] respectively.
 [J32] is the label for the sum.
 [J33] is the label for the average.
 [J33] is the label for the limits.
 [J34] is the label for logic decisions.
 [K32] is the sum of [K8] to [K31]
 [L32] is the sum of [L8] to [L31]
 [M32] is the sum of [M8] to [M31]
 [N32] is the sum of [N8] to [N31]
 [N8] to [N31] are imported from FIG. 7-3 [B6] as a function of wind direction [F]. They are wind limits for each wind sector.
 [K33] is the average of [K32] divided by [G4] the number of open hours (12 hours in this example).
 [L33] is the average of [L32] divided by [G4] the number of open hours (12 hours in this example).
 [M33] is the average of [M32] divided by [G4] the number of open hours (12 hours in this example).
 [N33] is the average of [N32] divided by [G4] the number of open hours (12 hours in this example).

[K34] is the limit for the average forecast wind (Vwf). [K35] is a logic "1" if the average is less than the limit. It is a logic "0" otherwise. [K35} follows this logic level.

[L34] is the limit for the average temperature from [N33] the average of the temperature limits and [L35] is a logic "1" if the average is more than the limit. It is a logic "0" otherwise.

[M34] is the limit for the average forecast rain. [M35] is a logic "1" if the average is less than the limit. It is a logic "0" otherwise.

[08 to 031] is a "1" if [D] is a Yes and "0" otherwise.

[P8 to P31] follow [K35]

[Q8 to Q31] follow [L35].

[R8 to R31] follow [M35]

[S] is AND gate with inputs [O],[P],[Q] and [R]

To test if the heaters may be shut down (when a event is possible) [S] is searched from present time forward until a "1" is found. The time/date, where the "1" is found, is reported to the spreadsheet illustrated FIGS. 7A and 7B as the time date the pool is to be open and at swimming temperatures (Tswim). In the event no "1" is located the need to calculate Tc to shut the heaters off is overridden and the pool is allowed to close. Normally the measured temperature Tm (current time) must be greater than Tc for the same time but if the opening is further in the future (no "1" in [S] FIG. 7E) then the spreadsheets cover this requirement is over ridden. After a "1" is located in [S](or overridden) the Tc is calculated. If Tm>Tc current time and the current [S] and the [S] for the next hour are both "0" the heaters are shut off.

Measured Data

With reference to FIG. 7F [B3] is the matrix identifier (address). The data (T2-T1), the difference between actual performance of the pool vs. produced performance during a controller heating cycle as measured during a controller heating cycle is used to fill out the cells of the X-Y Matrix FIG. 7F. The cells are the delta temperature changes recorded and recalled with Vwf on the vertical axis and Pw-Pdp on the horizontal axis. The 32 matrixes required for eight wind directions and four times of day are listed in FIG. 7G. In the future measured data in the cells (T2-T1) is recalled and used to determine Tc as shown in FIG. 7A. From the time and temperature that the pool is to be at swimming temperature (as shown in FIG. 7A) Tc is determined by subtracting the (T2-T1) temperature change for each hour backwards. To determine Tc (FIG. 7A) the database of measured data (FIG. 7F) is searched. If the cell contains measured data it is used in place of a calculated Tc in FIG. 7A. The cells are identified by time of day, wind direction, forecast wind (Vwf), and vapor pressure differential (Pw-Pdp). If the cell contains no measured data the Tc is calculated as previously discussed. Data is stored into the X-Y Matrix (FIG. 7F) after being recorded during a heating event as shown on the spreadsheet "Calculated Vwa and Recorded Tm" (FIG. 7B) for the appropriate conditions.

Latch Event Heat-up Cycle

At point D and time $D^1$ as illustrated in FIG. 6, a latch is set until the date and time of point $A^1$ is reached. There are three options described for the system.

Option 1 is to keep the heaters on until point A and/or time $A^1$ are reached in FIG. 6 under all circumstances.

Option 2 is to allow the heaters to be shut off if the weather forecast changes during a controller heater indicating the pool will not be used at the originally established opening $A^1$. In this case, a new $A^1$ must be found in the future and the Tc curve must be recalculated.

Option three is to allow the heaters to be shut off at any time from point D to point A of FIG. 6 if Tm gets ahead off Tc by a preset amount such as 4 degrees. The system would then keep the heaters off until Tm>Tc by a lower pre-set amount such as 2 degrees. It is best to make these changes on the hour. Options 2 and 3 can be combined.

The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

We claim:

1. A method for controlling the heating of a swimming pool having a heater with a control mechanism, comprising the steps of:

establishing and recording a minimum temperature, a maximum wind speed, pool water temperature and a plurality of times and dates in the future that will permit use of said pool;

checking the forecast weather for a first future time period and comparing the forecast air temperature and wind speed against said air temperature and wind speed from said establishing step for said time period to determine if they will not permit use of said pool for any of said times and dates established in said establishing step within said first future time period and recording the first said unpermitted time and date;

determining the next time and date in said first future time period that is after said first unpermitted time and date recorded in said checking step that will permit use of said pool by comparing the forecast air temperature and wind speed for the remainder of said first future time period to said air temperature and wind speed from said establishing step and recording any said next time and date;

calculating the time required for said heater to heat the pool water to said temperature from said establishing step prior to said next time and date that will permit use of said pool from said determining step and predicting the temperature of the water in the pool for all times between the current time and date and said next time and date that will permit use of said pool from said determining step utilizing the forecast weather for this time period;

measuring the temperature of the pool water;

periodically comparing the measured pool water temperature from said measuring step and said predicted pool water temperature from said calculating step for the same time;

overriding the heater control mechanism and causing the heater to be turned off if said checking step records a first unpermitted time and date and said measured pool water temperature is greater than said predicted pool water temperature and thereafter causing said heater to be turned on if said measured pool water temperature is not greater than said predicted pool water temperature; and returning control to said heater control mechanism at said next time and date that will permit use of said pool from said determining step.

2. The method of claim 1 further comprising the step of recording and correlating the measured pool water temperature from said measuring step and comparing it to the predicted pool water temperature from said calculating step whenever the overriding step causes said heater to be turned on.

3. The method of claim 1 wherein said step of returning control further comprises repeating said checking, determining, calculating, measuring, periodically comparing and overriding steps for future time periods.

4. The method of claim 3 further comprising the step of recording and correlating the measured pool water temperature from said measuring step and comparing it to the predicted pool water temperature from said calculating step whenever the overriding step causes said heater to be turned on.

5. The method of claim 4 wherein said calculating step takes into account any differences between the measured pool water temperature during the time that said heater is turned on in said overriding step to the predicted pool water temperature and adjust the time required for the said heater to heat the pool accordingly upon encountering the same forecast weather conditions in the future.

6. The method of claim 5 wherein said establishing step also establishes a maximum rainfall that will permit use of said pool and said checking and determining steps to compare said maximum rainfall to the forecast rainfall to determine whether use of said pool will be permitted for any of said times and dates established in said establishing step.

7. The method of claim 1 wherein said calculating step takes into account at least one of the following:

solar energy, wind direction, shade and dewpoint.

8. The method of claim 1 wherein said calculating step takes into account solar energy, wind direction, shade and dewpoint.

9. The method of claim 1 wherein the forecast weather in said checking step is periodically updated.

10. The method of claim 9 wherein said calculating step and said periodically comparing step are performed again any time said periodic update of said forecast weather indicates a change in the forecast weather.

11. The method of claim 1 wherein said step of overriding the heater control mechanism further requires there to be a minimum preselected amount of time between said first unpermitted time and date and said next time and date that will permit use.

12. An apparatus for controlling the heating of a swimming pool comprising;

a heater with a control mechanism;

means for recording a minimum temperature, a maximum wind speed, pool water temperature and a plurality of times and dates in the future that will permit use of said pool;

means for checking the forecast weather for a first future time period and comparing the forecast air temperature and wind speed against said air temperature and wind speed from said recording;

means for said time period to determine if they will not permit use of said pool for any of said times and dates recorded by said recording means within said first future time period and recording the first said unpermitted time and date;

means for determining the next time and date in said first future time period that is after said first unpermitted time and date recorded by said checking means that will permit use of said pool by comparing the forecast air temperature and wind speed for the remainder of said first future time period to said air temperature and wind speed from said recording means and recording any said next time and date;

means for calculating the time required for said heater to heat the pool water to said temperature in said recording means prior to said next time and date that will permit use of said pool from said determining means and predicting the temperature of the water in the pool for all times between the current time and date and said next time and date that will permit use of said pool from said recording means utilizing the forecast weather for this time period;

means for measuring the temperature of the pool water;

means for periodically comparing the measured pool water temperature from said measuring means and said predicted pool water temperature from said calculating means for the same time;

means for overriding the heater control mechanism and causing the heater to be turned off if said checking means records a first unpermitted time and date and said measured pool water temperature is greater than said predicted pool water temperature and thereafter causing said heater to be turned on if said measured pool water temperature is not greater than said predicted pool water temperature; and means for returning control to said heater control mechanism at said next time and date that will permit use of said pool from said determining means.

* * * * *